United States Patent
Wang et al.

(10) Patent No.: US 10,422,881 B1
(45) Date of Patent: Sep. 24, 2019

(54) MIRROR ASSEMBLY FOR LIGHT STEERING

(71) Applicant: DiDi Research America, LLC, Mountain View, CA (US)

(72) Inventors: Youmin Wang, Mountain View, CA (US); Qin Zhou, Mountain View, CA (US)

(73) Assignee: DiDi Research America, LLC, Mountain View, CA (US)

( * ) Notice: Subject to any disclaimer, the term of this patent is extended or adjusted under 35 U.S.C. 154(b) by 0 days.

(21) Appl. No.: 16/213,992

(22) Filed: Dec. 7, 2018

(51) Int. Cl.
*G01S 17/08* (2006.01)
*G01S 17/93* (2006.01)
*G01S 7/481* (2006.01)
*G02B 26/08* (2006.01)
*G02B 26/10* (2006.01)

(52) U.S. Cl.
CPC .......... *G01S 17/936* (2013.01); *G01S 7/4812* (2013.01); *G01S 7/4817* (2013.01); *G01S 17/08* (2013.01); *G02B 26/085* (2013.01); *G02B 26/0858* (2013.01); *G02B 26/105* (2013.01)

(58) Field of Classification Search
None
See application file for complete search history.

(56) References Cited

U.S. PATENT DOCUMENTS

| 5,221,933 | A * | 6/1993 | Chandler | G01R 5/16 |
| | | | | 346/107.3 |
| 9,063,549 | B1 * | 6/2015 | Pennecot | G05D 1/0259 |

| 2002/0164123 | A1 * | 11/2002 | Hamerly | H04B 10/2569 |
| | | | | 385/39 |
| 2003/0007202 | A1 * | 1/2003 | Moser | G02B 6/2931 |
| | | | | 359/15 |
| 2003/0053156 | A1 * | 3/2003 | Satoh | G02B 26/0841 |
| | | | | 358/511 |
| 2003/0086147 | A1 * | 5/2003 | Bruns | G02B 6/3518 |
| | | | | 359/291 |

(Continued)

FOREIGN PATENT DOCUMENTS

CN  106353891  1/2017

OTHER PUBLICATIONS

International Search Report and Written Opinion for PCT/US2018/065039, dated Mar. 15, 2019, 9 pages.

*Primary Examiner* — Navid Ziaeianmehdizadeh
(74) *Attorney, Agent, or Firm* — Kilpatrick Townsend & Stockton LLP

(57) ABSTRACT

Methods and systems for light steering are proposed. In one example, an apparatus comprises: a light source; a receiver; a microelectromechanical system (MEMS) and a controller. The MEMS comprises: an array of first rotatable mirrors to receive and reflect the light beam from the light source and a second rotatable mirror to receive the light beam reflected by the array of first rotatable mirrors. The controller is configured to rotate, respectively, the array of first rotatable mirrors and the second rotatable mirror to set a first angle of light path with respect to a first dimension and to set a second angle of the light path with respect to a second dimension orthogonal to the first dimension to perform at least one of: reflecting light from the light source along the light path, or reflecting input light propagating along the light path to the receiver.

17 Claims, 15 Drawing Sheets

(56) References Cited

U.S. PATENT DOCUMENTS

| | | | |
|---|---|---|---|
| 2004/0202407 A1* | 10/2004 | Hoke | G02B 6/359 385/18 |
| 2004/0263937 A1* | 12/2004 | Fujii | G02B 26/0841 359/199.1 |
| 2005/0185237 A1* | 8/2005 | Nakajima | B41J 2/471 359/224.1 |
| 2007/0053035 A1 | 3/2007 | Cho et al. | |
| 2010/0046054 A1* | 2/2010 | Jeong | G02B 26/085 359/200.7 |
| 2011/0164783 A1* | 7/2011 | Hays | G01S 17/58 382/100 |
| 2012/0281265 A1* | 11/2012 | Zhang | G02B 21/0048 359/212.1 |
| 2013/0057936 A1* | 3/2013 | Wang | G02B 26/0858 359/199.1 |
| 2013/0188043 A1* | 7/2013 | Decoster | G01S 7/4814 348/135 |
| 2013/0242363 A1 | 9/2013 | Weiss et al. | |
| 2013/0301095 A1* | 11/2013 | Zhang | G02B 26/0841 359/200.6 |
| 2014/0078519 A1* | 3/2014 | Steffey | G01S 7/4817 356/625 |
| 2014/0151535 A1* | 6/2014 | Mori | G01S 17/42 250/214.1 |
| 2016/0139404 A1* | 5/2016 | Akanuma | G02B 26/0825 356/5.01 |
| 2016/0146939 A1 | 5/2016 | Shpunt et al. | |
| 2016/0282468 A1* | 9/2016 | Gruver | H05K 999/99 |
| 2017/0097419 A1* | 4/2017 | Murayama | G01S 7/4813 |
| 2017/0242104 A1* | 8/2017 | Dussan | G01S 7/4814 |
| 2017/0307737 A1* | 10/2017 | Ishikawa | G02B 26/10 |
| 2017/0307876 A1* | 10/2017 | Dussan | G01S 17/42 |
| 2018/0011173 A1* | 1/2018 | Newman | G01S 17/936 |
| 2018/0252816 A1* | 9/2018 | Tanaka | G01S 17/895 |
| 2018/0275249 A1 | 9/2018 | Campbell et al. | |
| 2018/0284285 A1* | 10/2018 | Curatu | G01S 17/10 |
| 2018/0284286 A1* | 10/2018 | Eichenholz | G01S 17/936 |
| 2018/0329204 A1* | 11/2018 | Smits | G02B 26/105 |
| 2019/0041500 A1* | 2/2019 | Isono | G01S 7/4813 |
| 2019/0056496 A1* | 2/2019 | Sakai | G01S 17/026 |

* cited by examiner

MIRROR ASSEMBLY FOR LIGHT STEERING

CROSS-REFERENCES TO RELATED APPLICATIONS

The following eight U.S. patent applications listed below (which includes the present application) are being filed concurrently, and the entire disclosures of the other applications are incorporated by reference into this application for all purposes:

Application Ser. No. 16/213,990, filed Dec. 7, 2018, entitled "MULTI-THRESHOLD LIDAR DETECTION;"

Application Ser. No. 16/213,992, filed Dec. 7, 2018, entitled "MIRROR ASSEMBLY FOR LIGHT STEERING;"

Application Ser. No. 16/213,992, filed Dec. 7, 2018, entitled "COUPLED AND SYNCHRONOUS MIRROR ELEMENTS IN A LIDAR-BASED MICRO-MIRROR ARRAY;"

Application Ser. No. 16/214,010, filed Dec. 7, 2018, entitled "COUPLED AND SYNCHRONOUS MIRROR ELEMENTS IN A LIDAR-BASED MICRO-MIRROR ARRAY;"

Application Ser. No. 16/214,013, filed Dec. 7, 2018, entitled "NON-LINEAR SPRINGS TO UNIFY THE DYNAMIC MOTION OF INDIVIDUAL ELEMENTS IN A MICRO-MIRROR ARRAY;"

Application Ser. No. 16/213,995, filed Dec. 7, 2018, entitled "NON-LINEAR SPRINGS TO UNIFY THE DYNAMIC MOTION OF INDIVIDUAL ELEMENTS IN A MICRO-MIRROR ARRAY;"

Application Ser. No. 16/213,999, filed Dec. 7, 2018, entitled "A LEVER SYSTEM FOR DRIVING MIRRORS OF A LIDAR TRANSMITTER;" and Application Ser. No. 16/214,001, filed Dec. 7, 2018, entitled "SYSTEM AND METHODS FOR CONTROLLING MICRO-MIRROR ARRAY."

BACKGROUND

Light steering typically involves the projection of light in a pre-determined direction to facilitate, for example, the detection and ranging of an object, the illumination and scanning of an object, or the like. Light steering can be used in many different fields of applications including, for example, autonomous vehicles, medical diagnostic devices, etc.

Light steering can be performed in both transmission and reception of light. For example, a light steering system may include a micro-mirror array to control the projection direction of light to detect/image an object. Moreover, a light steering receiver may also include a micro-mirror array to select a direction of incident light to be detected by the receiver, to avoid detecting other unwanted signals. The micro-mirror array may include an array of micro-mirror assemblies, with each micro-mirror assembly comprising a micro-mirror and an actuator. In a micro-mirror assembly, a micro-mirror can be connected to a substrate via a connection structure (e.g., a torsion bar, a spring, etc.) to form a pivot, and the micro-mirror can be rotated around the pivot by the actuator. Each micro-mirror can be rotated by a rotation angle to reflect (and steer) light from a light source towards at a target direction. Each micro-mirror can be rotated by the actuator to provide a first range of angles of projection along a vertical axis and to provide a second range of angles of projection along a horizontal axis. The first range and the second range of angles of projection can define a two-dimensional field of view (FOV) in which light is to be projected to detect/scan an object. The FOV can also define the direction of incident lights, reflected by the object, are to be detected by the receiver.

The mirror assembly can dominate various performance metrics of the light steering system including, for example, precision, actuation power, FOV, dispersion angle, reliability, etc. It is desirable to provide a mirror assembly that can improve these performance metrics.

BRIEF SUMMARY

In some embodiments, an apparatus comprises a Light Detection and Ranging (LiDAR) module. The LiDAR module comprises: a light source; a receiver; and a semiconductor integrated circuit comprising a microelectromechanical system (MEMS) and a controller. The MEMS comprises: an array of first rotatable mirrors to receive and reflect the light beam from the light source; a second rotatable mirror to receive the light beam reflected by the array of first rotatable mirrors; an array of first actuators configured to rotate each rotatable mirror of the array of first rotatable mirrors; and a second actuator configured to rotate the second rotatable mirror. The controller is configured to control the array of first actuators and the second actuator to rotate, respectively, the array of first rotatable mirrors and the second rotatable mirror to set a first angle of light path with respect to a first dimension and to set a second angle of the light path with respect to a second dimension orthogonal to the first dimension to perform at least one of: reflecting light from the light source along the light path, or reflecting input light propagating along the light path to the receiver. In some aspects, the light source is a laser diode.

In some aspects, the light comprises a first light signal. The controller is configured to: control the light source to transmit the light including the first light signal at a first time; control the array of first actuators and the second actuator to output the light including the first light signal along the light path towards an object; control the array of first the array of first actuators and the second actuator to select the input light including a second light signal propagating along the light path from the object; receive, via the receiver, the second light signal at a second time; and determine a location of the object with respect to the apparatus based on a difference between the first time and the second time, the first angle, and the second angle.

In some aspects, the array of first rotatable mirrors and the second rotatable mirror are formed on a surface of a semiconductor substrate of the semiconductor integrated circuit. The apparatus may further comprise a third mirror facing the array of first rotatable mirrors and the second rotatable mirror and configured to reflect the light reflected from the array of first rotatable mirrors towards the second rotatable mirror. In some aspects, the third mirror is separated from the surface of the semiconductor substrate by a first distance. The array of the first rotatable mirrors and the second rotatable mirror are separated by a second distance. The first distance and the second distance are set based on an angle of incidence of the light from the light source with respect to the first rotatable mirror.

In some aspects, the apparatus further comprises a collimator lens positioned between the light source and the first rotatable mirror. The collimator lens has a pre-determined aperture length. In some aspects, each dimension of the array of first rotatable mirrors and of the second rotatable mirror is substantially equal to the aperture length.

In some aspects, the array of first rotatable mirrors are formed on a first surface of a first semiconductor substrate of the semiconductor integrated circuit. The second rotatable mirror is formed on a second surface of a second semiconductor substrate of the semiconductor integrated circuit. The first surface faces the second surface.

In some aspects, a mass of each rotatable mirror of the array of first rotatable mirrors is smaller than a mass of the second rotatable mirror. The controller is configured to adjust a first rotation angle of each rotatable mirror of the array of first rotatable mirrors at a first frequency. The controller is further configured to adjust a second rotation angle of the second rotatable mirror at a second frequency higher than the first frequency, the second frequency being substantially equal to a natural frequency of the second rotatable mirror.

In some aspects, each actuator of the array of first actuators and the second actuator comprises a rotary drive. The controller is configured to adjust the first rotation angle and the second rotation angle based on adjusting, respectively, a first torque provided by each actuator of the array of first actuators and a second torque provided by the second actuator.

In some aspects, each actuator of the array of first actuators and second actuator comprises at least one of: a comb drive, a piezoelectric device, or an electromagnetic device.

In some aspects, the apparatus further comprises motion sensors, each motion sensor being coupled with each rotatable mirror of the array of first rotatable mirrors and the second rotatable mirror and configured to measure a rotation angle of each of the array of first rotatable mirrors and the second rotatable mirror. The controller is further configured to: receive data from the motion sensors; and determine a signal for each actuator of the first rotatable mirror and the second rotatable mirror based on the data such that each rotatable mirror of the array of first rotatable mirrors and the second rotatable mirror rotate at, respectively, a first target angle and a second target angle.

In some embodiments, a method is provided. The method further comprises: determining a first angle and a second angle of a light path, the light path being one of a projection path for output light or an input path of input light, the first angle being with respect to a first dimension, the second angle being with respect to a second dimension orthogonal to the first dimension; controlling an array of first actuators to rotate an array of first rotatable micro-mirrors of a microelectromechanical system (MEMS) to set the first angle; controlling a second actuator to rotate a second rotatable mirror of the MEMS to set the second angle; projecting, using a light source, a light beam including a light signal towards a mirror assembly, the mirror assembly comprising an array of first rotatable mirrors and a second rotatable mirror; and with the array of first rotatable mirrors set at the first angle and the second rotatable mirror set at the second angle, performing at least one of: reflecting the output light from the light source along the projection path towards an object, or reflecting the input light propagating along the input path to a receiver.

In some aspects, the method further comprises: controlling the light source to transmit the output light including a first light signal at a first time; controlling the array of first actuators and the second actuator to output the output light including the first light signal along the light path towards an object; controlling the array of first the array of first actuators and the second actuator to select the input light including a second light signal propagating along the light path from the object; receiving, via the receiver, the second light signal at a second time; and determining a location of the object based on a difference between the first time and the second time, the first angle, and the second angle.

In some aspects, the method further comprises: adjusting a first rotation angle of each rotatable mirror of the array of first rotatable mirrors at a first frequency; and adjusting a second rotation angle of the second rotatable mirror at a second frequency higher than the first frequency, the second frequency being substantially equal to a natural frequency of the second rotatable mirror.

In some aspects, the method further comprises: receiving, from motion sensors, information indicating the first rotation angle of each rotatable mirror of the array of first rotatable mirrors and the second rotation angle of the second rotatable mirror; adjusting first control signals to the array of first actuators based on a difference between the first rotation angle and a first target rotation angle; and adjusting a second control signal to the second actuator based on a difference between the second rotation angle and a second target rotation angle.

In some embodiments, a non-transitory computer readable medium is provided. The computer readable medium stores instructions that, when executed by a hardware processor, causes the hardware processor to: determine a first angle and a second angle of a light path, the light path being one of a projection path for output light or an input path of input light, the first angle being with respect to a first dimension, the second angle being with respect to a second dimension orthogonal to the first dimension; control an array of first actuators to rotate an array of first rotatable micro-mirrors of a microelectromechanical system (MEMS) to set the first angle; control a second actuator to rotate a second rotatable mirror of the MEMS to set the second angle; project, using a light source, a light beam including a light signal towards a mirror assembly, the mirror assembly comprising an array of first rotatable mirrors and a second rotatable mirror; and with the array of first rotatable mirrors set at the first angle and the second rotatable mirror set at the second angle, perform at least one of: reflecting the output light from the light source along the projection path towards an object, or reflecting the input light propagating along the input path to a receiver.

In some aspects, the computer readable medium further stores instructions that, when executed by the hardware processor, cause the hardware processor to: control the light source to transmit the output light including a first light signal at a first time; control the array of first actuators and the second actuator to output the output light including the first light signal along the light path towards an object; control the array of first the array of first actuators and the second actuator to select the input light including a second light signal propagating along the light path from the object; receive, via the receiver, the second light signal at a second time; and determine a location of the object based on a difference between the first time and the second time, the first angle, and the second angle.

In some aspects, the computer readable medium further stores instructions that, when executed by the hardware processor, cause the hardware processor to: adjust a first rotation angle of each rotatable mirror of the array of first rotatable mirrors at a first frequency; and adjust a second rotation angle of the second rotatable mirror at a second frequency higher than the first frequency, the second frequency being substantially equal to a natural frequency of the second rotatable mirror.

BRIEF DESCRIPTION OF THE DRAWINGS

The detailed description is set forth with reference to the accompanying figures.

DETAILED DESCRIPTION

Figure 1:
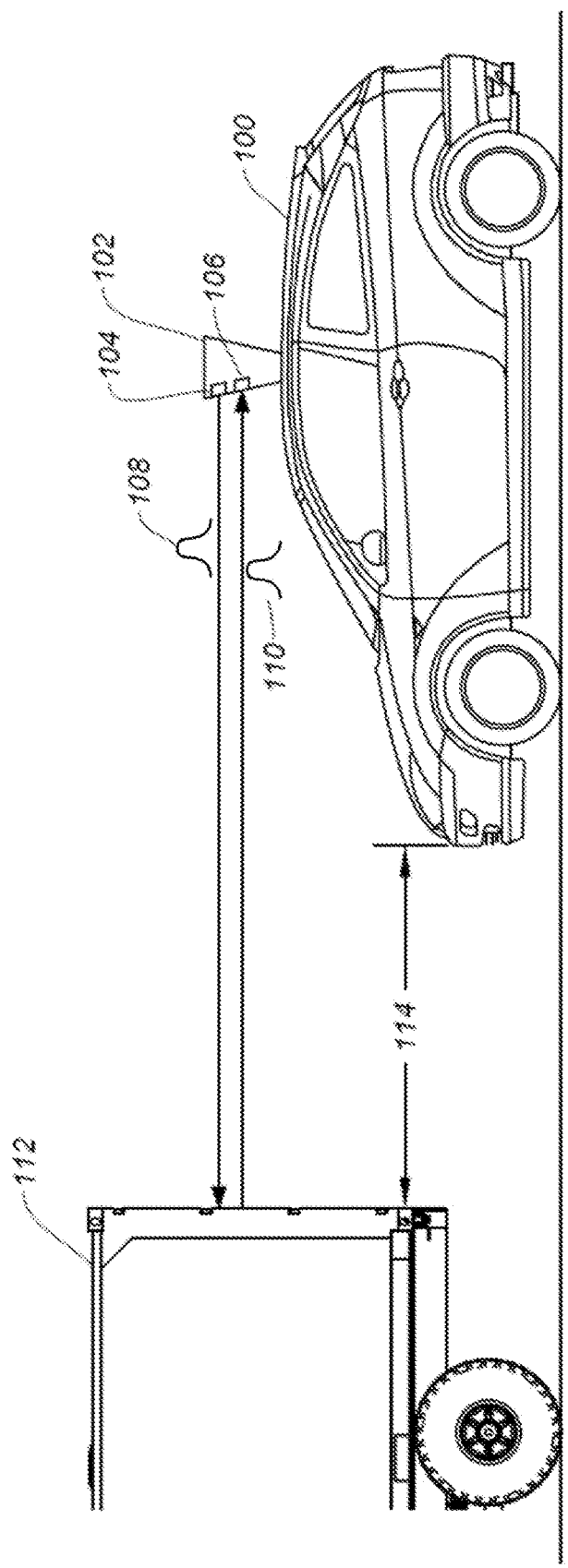
FIG. 1 shows an autonomous driving vehicle utilizing aspects of certain embodiments of the disclosed techniques herein.

In the following description, various examples of a mirror assembly and a light steering system will be described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Light steering can be found in different applications. For example, a Light Detection and Ranging (LiDAR) module of a vehicle may include a light steering system. The light steering system can be part of the transmitter to steer light towards different directions to detect obstacles around the vehicle and to determine the distances between the obstacles and the vehicle, which can be used for autonomous driving. Moreover, a receiver may also include a micro-mirror array to select a direction of incident light to be detected by the receiver, to avoid detecting other unwanted signals. Further, the head light of a manually-driven vehicle can include the light steering system, which can be controlled to focus light towards a particular direction to improve visibility for the driver. In another example, optical diagnostic equipment, such as an endoscope, can include a light steering system to steer light in different directions onto an object in a sequential scanning process to obtain an image of the object for diagnosis.

Light steering can be implemented by way of a micro-mirror array. The micro-mirror array can have an array of micro-mirror assemblies, with each micro-mirror assembly having a movable micro-mirror and an actuator (or multiple actuators). The micro-mirrors and actuators can be formed as microelectromechanical systems (MEMS) on a semiconductor substrate which allows integration of the MEMS with other circuitries (e.g., controller, interface circuits, etc.) on the semiconductor substrate. In a micro-mirror assembly, a micro-mirror can be connected to the semiconductor substrate via a connection structure (e.g., a torsion bar, a spring, etc.) to form a pivot. The actuator can rotate the micro-mirror around the pivot, with the connection structure deformed to accommodate the rotation. The array of micro-mirrors can receive incident light beam, and each micro-mirror can be rotated at a common rotation angle to project/steer the incident light beam at a target direction. Each micro-mirror can be rotated around two orthogonal axes to provide a first range of angles of projection along a vertical dimension and to provide a second range of angles of projection along a horizontal dimension. The first range and the second range of angles of projection can define a two-dimensional field of view (FOV) in which light is to be projected to detect/scan an object. The FOV can also define the direction of incident lights, reflected by the object, are to be detected by the receiver.

In some examples, each micro-mirror assembly may include a single micro-mirror. The single micro-mirror can be coupled with a pair of actuators on a frame of a gimbal structure and rotatable on a first axis. The frame of the gimbal structure is further coupled with the semiconductor substrate and rotatable on a second axis orthogonal to the first axis. A first pair of actuators can rotate the mirror around the first axis with respect to the frame to steer the light along a first dimension, whereas a second pair of actuators can rotate the frame around a second axis to steer the light along a second dimension. Different combinations of angle of rotations around the first axis and the second axis can provide a two-dimensional FOV in which light is to be projected to detect/scan an object. The FOV can also define the direction of incident lights, reflected by the object, are to be detected by the receiver.

Although such arrangements allow the projection of light to form a two-dimensional FOV, there may be a number of potential disadvantages. First, having a single mirror to provide light steering can require a relatively high actuation force to achieve a target FOV and a target dispersion, which can reduce reliability. More specifically, to reduce dispersion, the size of the mirror can be made to match the width of the light beam from the light source, which leads to increased mass and inertia of the mirror. As a result, a larger actuation force (e.g., torque) may be needed to rotate the mirror to achieve a target FOV. The torque required typically is in the order of micro N-m. Subjecting the actuators to larger actuation forces, especially for MEMS actuators, can shorten the lifespan and reduce the reliability of the actuators. Moreover, the reliability of the MEMS actuators may be further degraded when the light steering system relies solely on the single mirror to steer the light, which can become a single point of failure.

Conceptual Overview of Certain Embodiments

Examples of the present disclosure relate to a light steering system that can address the problems described above. Various embodiments of the light steering system can include a plurality of mirrors to perform light steering, such as those shown and described below with respect to FIG. 3A-FIG. 3E, FIG. 5A, FIG. 6, and FIG. 7. The light steering system can be used as part of a transmitter to control a direction of projection of output light. The light steering system can also be used as part of a receiver to select a direction of input light to be detected by the receiver. The light steering system can also be used in a coaxial configuration such that the light steering system can project output light to a location and detects light reflected from that location.

In some embodiments, a light steering system may include a light source, a first rotatable mirror, a second rotatable mirror, and a receiver. The first rotatable mirror and the second rotatable mirror can define an output projection path for light transmitted by the light source, or to select an input path for input light to be received by the receiver. The first rotatable mirror and the second rotatable mirror can be rotatable to steer the output projection path or the input path at different angles with respect to, respectively, a first dimension and a second dimension orthogonal to the first dimension, to form a two-dimensional FOV.

The light steering system may further include a first actuator configured to rotate the first rotatable mirror around a first axis, a second actuator configured to rotate the second rotatable mirror around a second axis orthogonal to the first axis, and a controller coupled with the first actuator and the second actuator. The controller may control the first actuator and the second actuator to apply a first torque and a second torque to rotate, respectively, the first rotatable mirror and the second rotatable mirror along, respectively, the first axis and the second axis. The controller can control the first actuator and the second actuator to steer the output projection path or the input path at different angles with respect to the first dimension and the second dimension according to a movement sequence, such as those shown and described below with respect to FIG. 4 and FIG. 5B, to create the two-dimensional FOV.

Figure 3A:
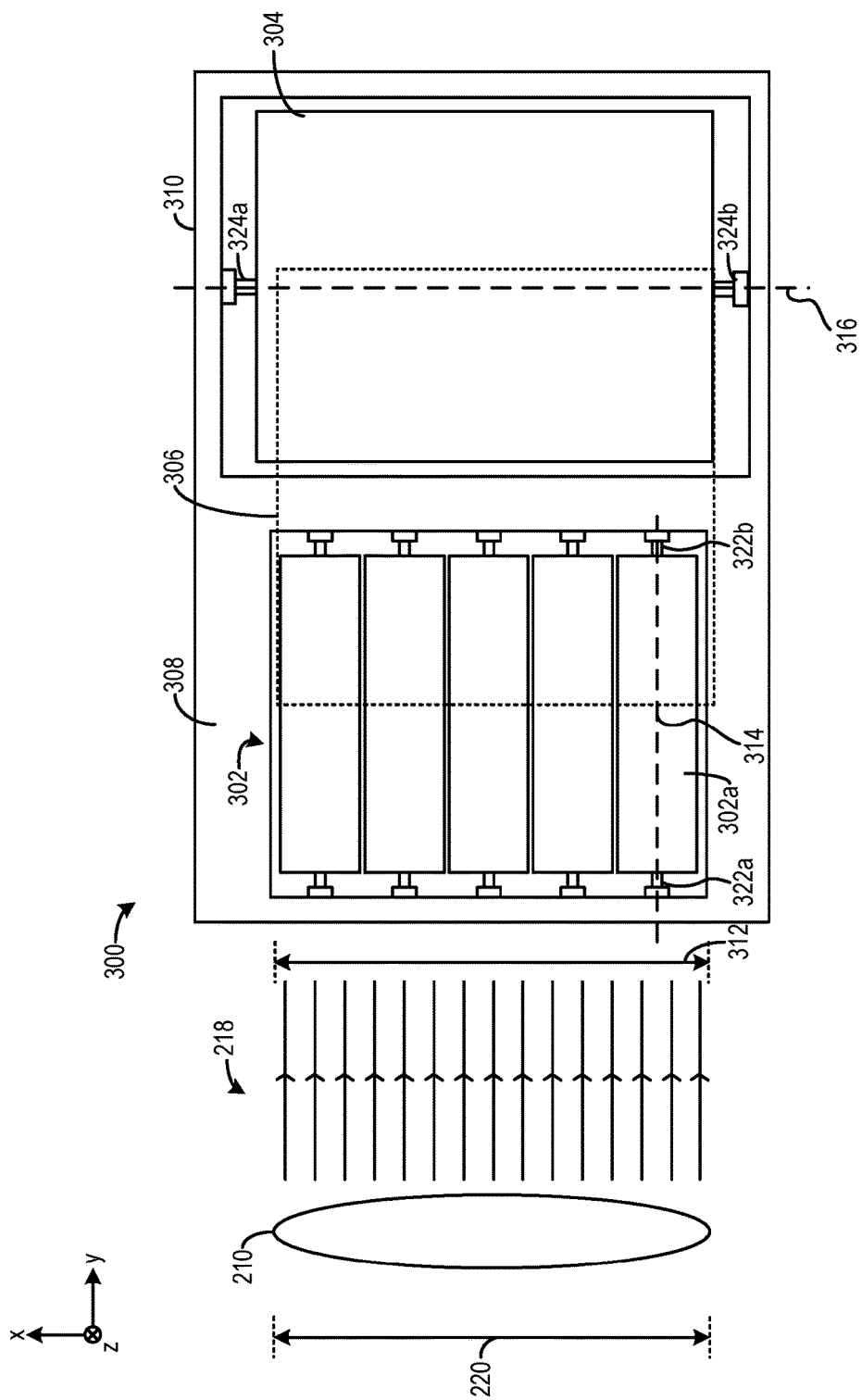
FIG. 3A-FIG. 3E illustrate an example of a mirror assembly and its operations, according to certain embodiments.
Figure 3B:
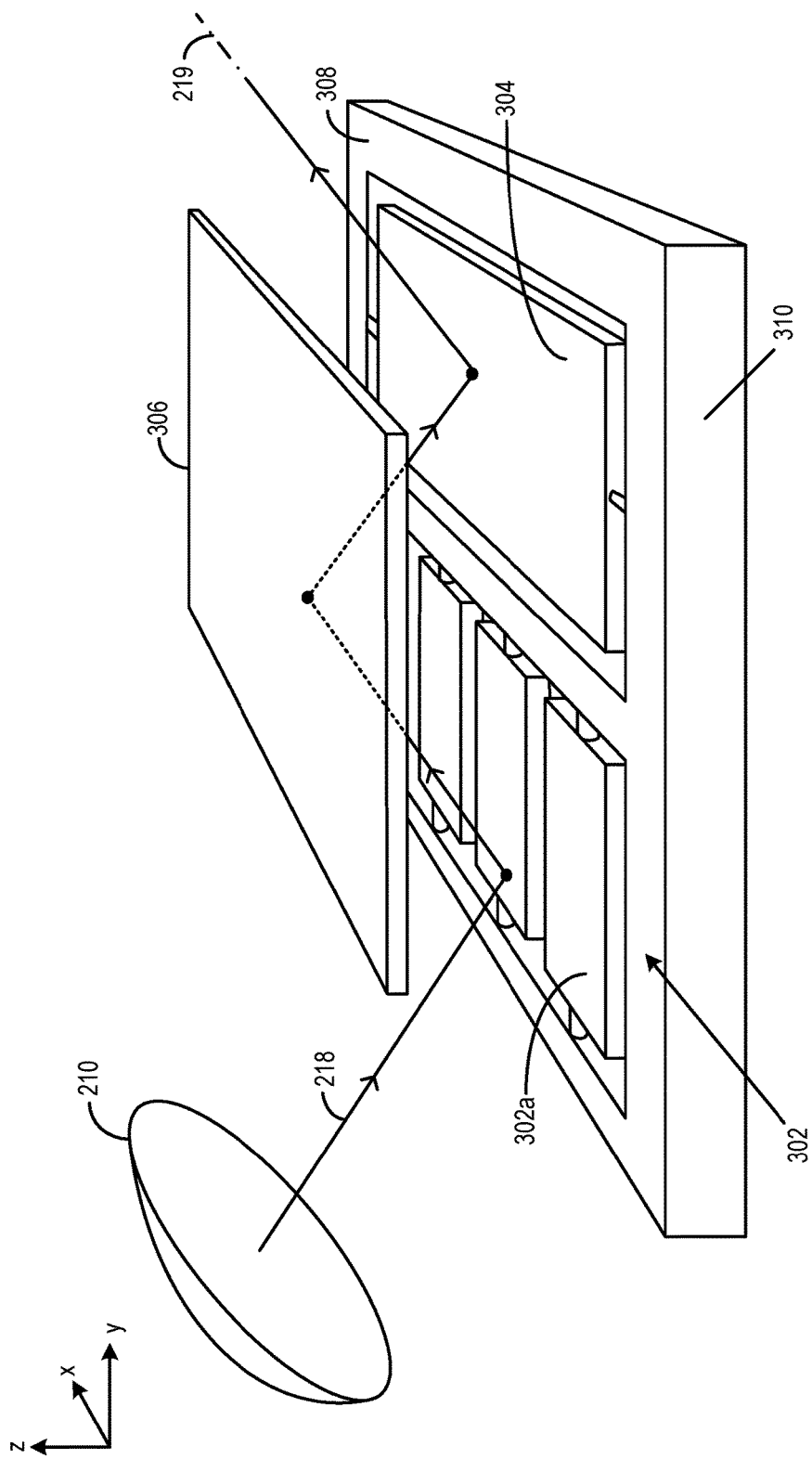

In some embodiments, the first rotatable mirror and the second rotatable mirror can be arranged on the same surface of a semiconductor substrate, as shown in FIG. 3A. The light steering system can further include a stationary third mirror stacked on top of the semiconductor substrate and facing the surface of the semiconductor substrate. As shown in FIG. 3B, light from the light source, or input light from the environment, can be reflected by the first rotatable mirror, which can set a first angle of the output projection path of the light with respect to the first dimension (e.g., an x-axis or a y-axis). The light reflected by the first rotatable mirror can reach the third mirror, which may reflect the light towards the second rotatable mirror. The second rotatable mirror can set an angle of the output projection path or an input path with respect to the second dimension (e.g., the z-axis of FIG. 4D). Different values of the first angle and the second angle can be obtained by rotating the first rotatable mirror and the second rotatable mirror to form the FOV.

Figure 5A:
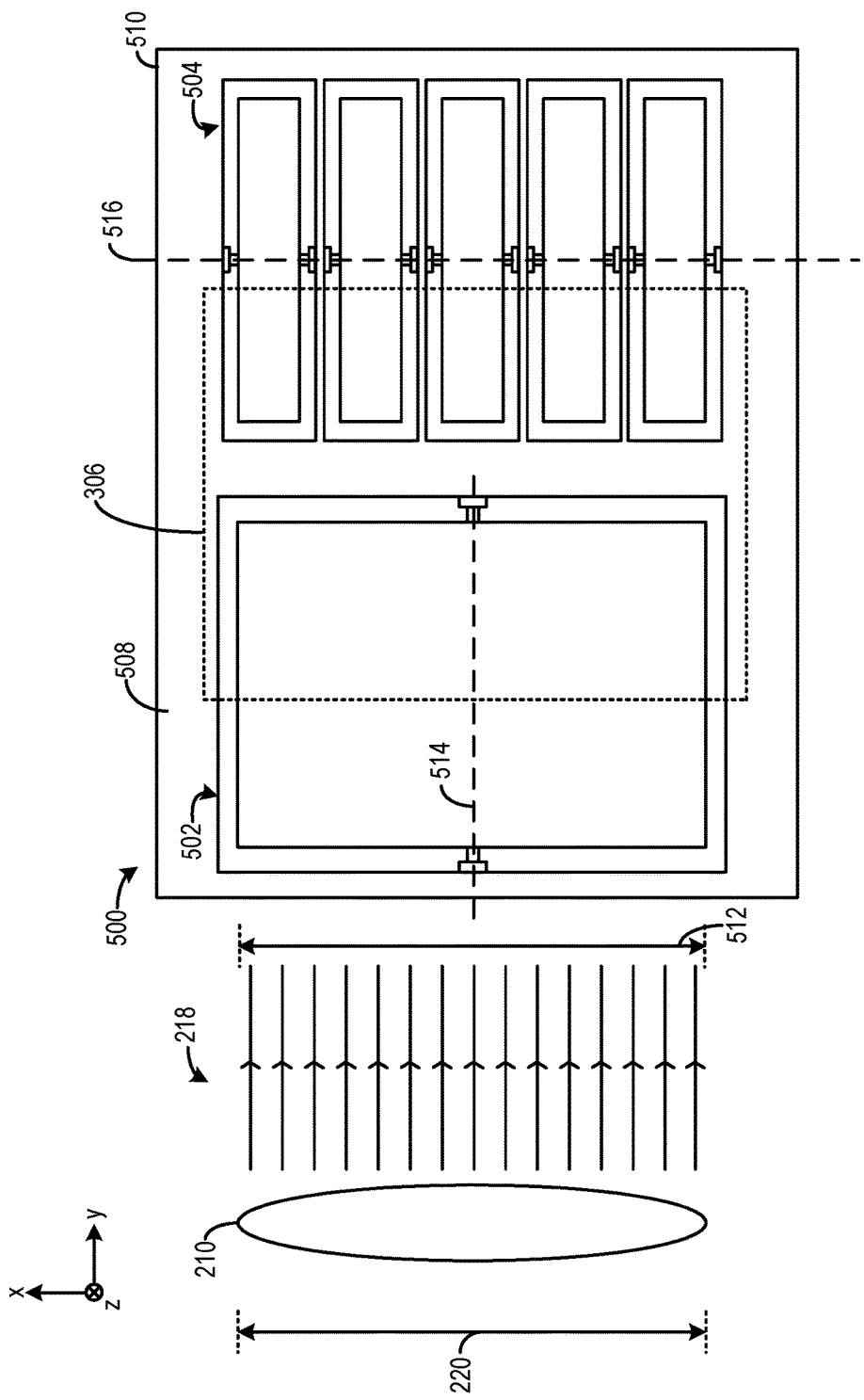
FIG. 5A and FIG. 5B illustrate another example of a mirror assembly, according to certain embodiments.
Figure 6:
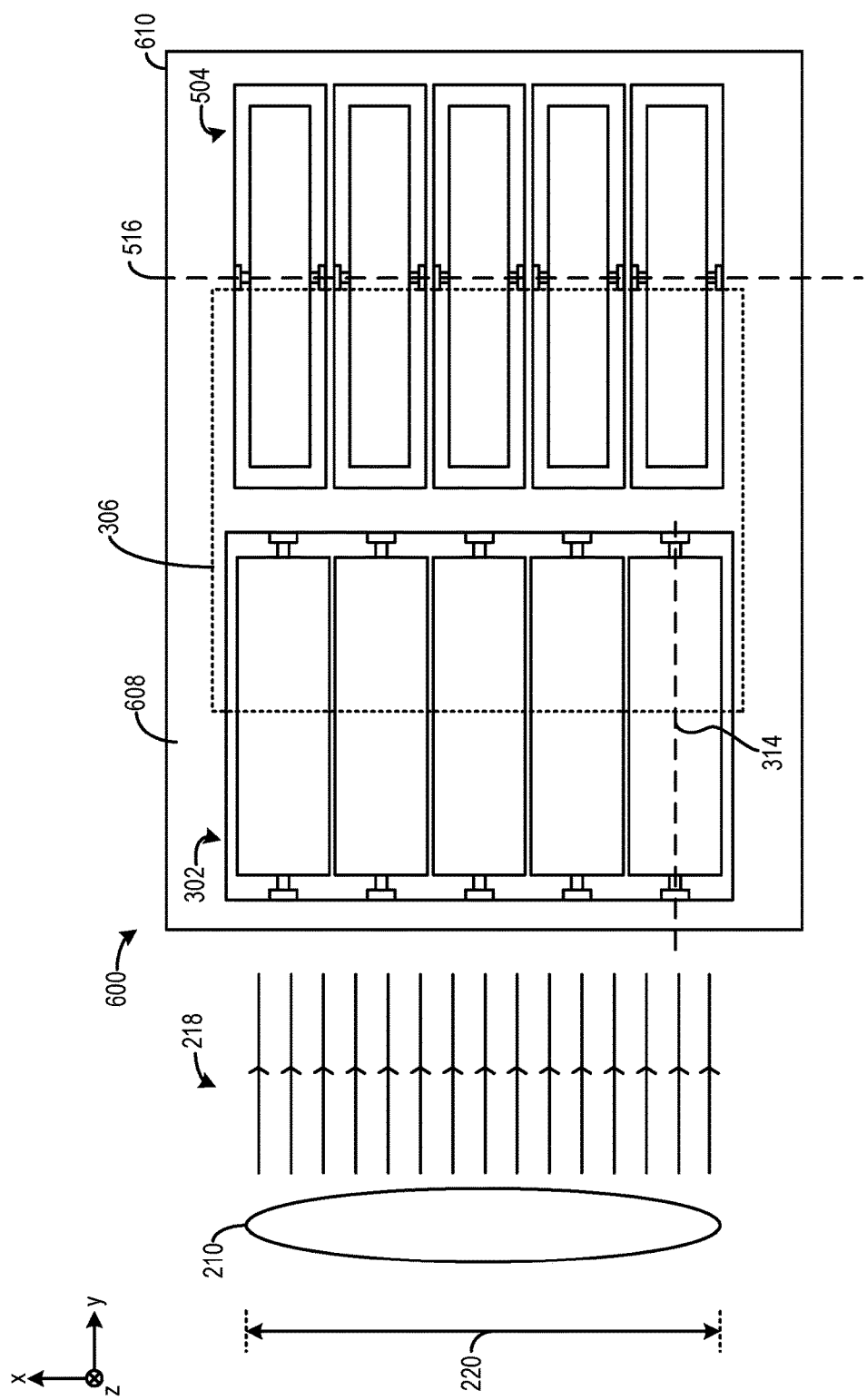
FIG. 6 illustrates another example of a mirror assembly, according to certain embodiments.

In some embodiments, as shown in FIG. 3A, the light steering system can include a first array of mirrors including the first rotatable mirror, with each rotatable mirror of the array rotatable around the first axis, and a single second rotatable mirror rotatable around the second axis. In some embodiments, as shown in FIG. 5A, the light steering system can also include a single first rotatable mirror, and an array of second rotatable mirrors, with each rotatable mirror of the array rotatable around the second axis. In some embodiments, as shown in FIG. 6, the light steering system can also include a first array of rotatable mirrors and a second array of rotatable mirrors. The first array of rotatable mirrors may be rotatable around the first axis. Moreover, the second array of mirrors may be rotatable around the second axis.

In some embodiments, the first rotatable mirror and the second rotatable mirror can be arranged on two different semiconductor substrates, as shown and described below with respect to FIG. 7. The first rotatable mirror can be arranged on a first surface of the first semiconductor, whereas the second rotatable mirror can be arranged on a second surface of the second semiconductor, with the first surface facing the second surface. Light from the light source can be reflected by the first rotatable mirror, which can set the first angle of the output projection path or input path with respect to the first dimension (e.g., the x-axis or the y-axis). The light reflected by the first rotatable mirror can reach the second rotatable mirror, which can rotate around the second axis to set a second angle of the output projection path or the input path with respect to the second dimension (e.g., the z-axis).

Compared with an arrangement where a light steering system uses a single mirror having two axes of rotation to provide two ranges of projection or input angles to form a FOV, certain embodiments of the present disclosure can use a first rotatable mirror and a second rotatable mirror (or an array of first rotatable mirrors and a second rotatable mirror) with each having a single but orthogonal rotational axis to provide the two ranges of angles that form the FOV. Such arrangements can improve reliability (especially where the mirrors are MEMS devices) and precision, and can reduce actuation power, while providing the same or superior FOV and dispersion. First, by using two mirrors to provide two ranges of angles to provide the same FOV as the single mirror, some of the mirrors can be made smaller than the single mirror and may require less actuation force to rotate than the single mirror. The actuation of the two different mirrors can also be independently optimized to further reduce the total actuation force. The reduction of the actuation forces can also reduce the burden on the actuators and increases the lifespan of the actuators. Moreover, due to the smaller mirrors, embodiments of the present disclosure can provide a larger FOV compared with the single mirror implementation in response to the same actuation force. The mirrors can be configured to provide the same mirror surface area as the single mirror, which can provide the same dispersion as the single mirror. In addition, where a plurality of mirrors are involved in the steering of light, the likelihood that any of the mirrors becoming a single source of failure can be mitigated, which can further improve reliability. All of these can improve the robustness and performance of a light steering system over conventional implementations.

Typical System Environment for Certain Embodiments

FIG. 1 illustrates an autonomous vehicle 100 in which the disclosed techniques can be implemented. Autonomous vehicle 100 includes a LiDAR module 102. LiDAR module 102 allows autonomous vehicle 100 to perform object detection and ranging in a surrounding environment. Based on the result of object detection and ranging, autonomous vehicle 100 can maneuver to avoid a collision with the object. LiDAR module 102 can include a light steering system 104 and a receiver 106. Light steering system 104 can project one or more light signals 108 at various directions at different times in any suitable scanning pattern, while receiver 106 can monitor for a light signal 110 which is generated by the reflection of light signal 108 by an object. Light signals 108 and 110 may include, for example, a light pulse, a frequency modulated continuous wave (FMCW) signal, an amplitude modulated continuous wave (AMCW) signal, etc. LiDAR module 102 can detect the object based on the reception of light signal 110, and can perform a ranging determination (e.g., a distance of the object) based on a time difference between light signals 108 and 110. For example, as shown in FIG. 1, LiDAR module 102 can transmit light signal 108 at a direction directly in front of autonomous vehicle 100 at time T1 and receive light signal 110 reflected by an object 112 (e.g., another vehicle) at time T2. Based on the reception of light signal 110, LiDAR module 102 can determine that object 112 is directly in front of autonomous vehicle 100. Moreover, based on the time difference between T1 and T2, LiDAR module 102 can also determine a distance 114 between autonomous vehicle 100 and object 112. Autonomous vehicle 100 can adjust its speed (e.g., slowing or stopping) to avoid collision with object 112 based on the detection and ranging of object 112 by LiDAR module 102.

Figure 2A:
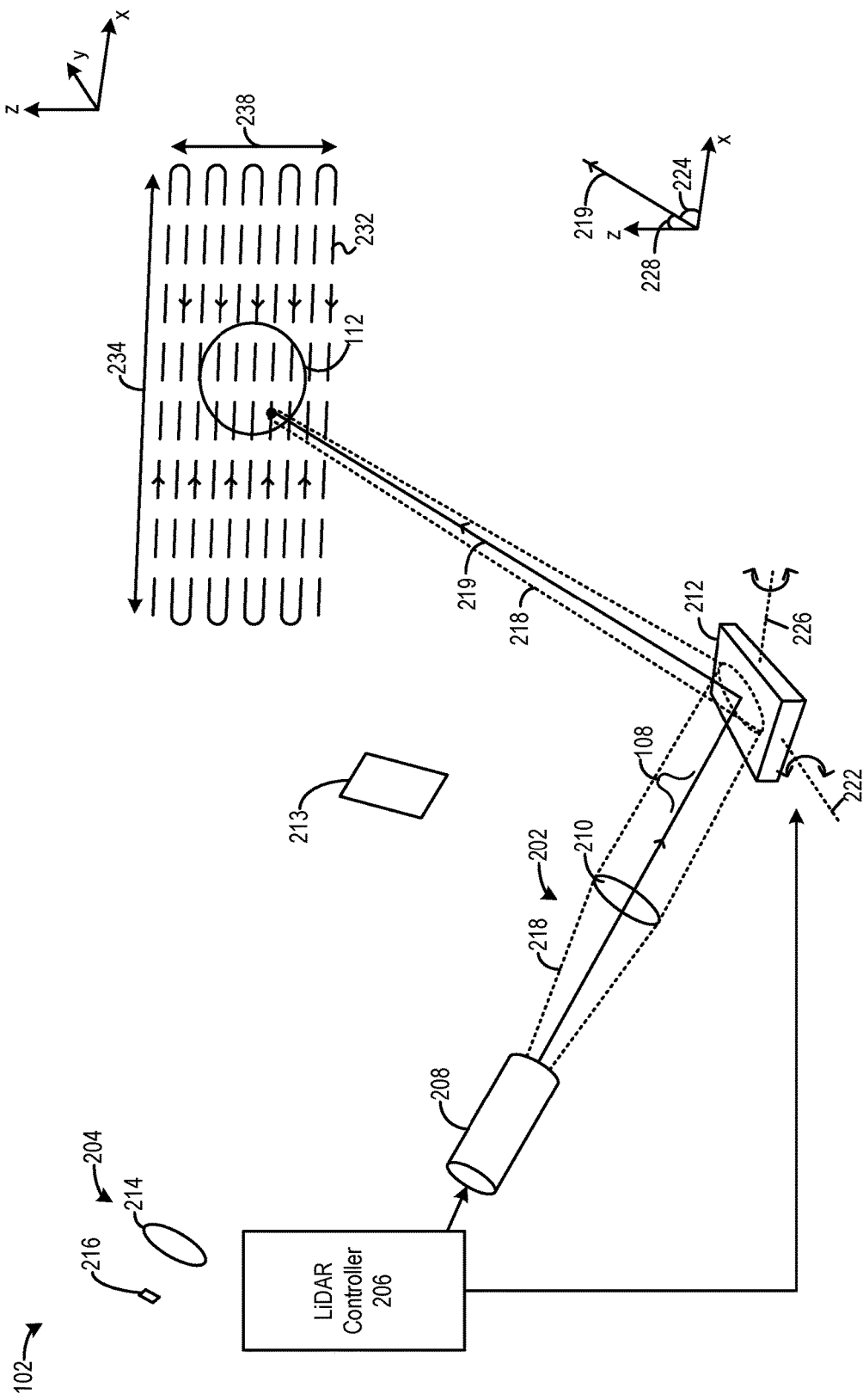
FIG. 2A and FIG. 2B illustrate an example of a light steering system, according to certain embodiments.
Figure 2B:
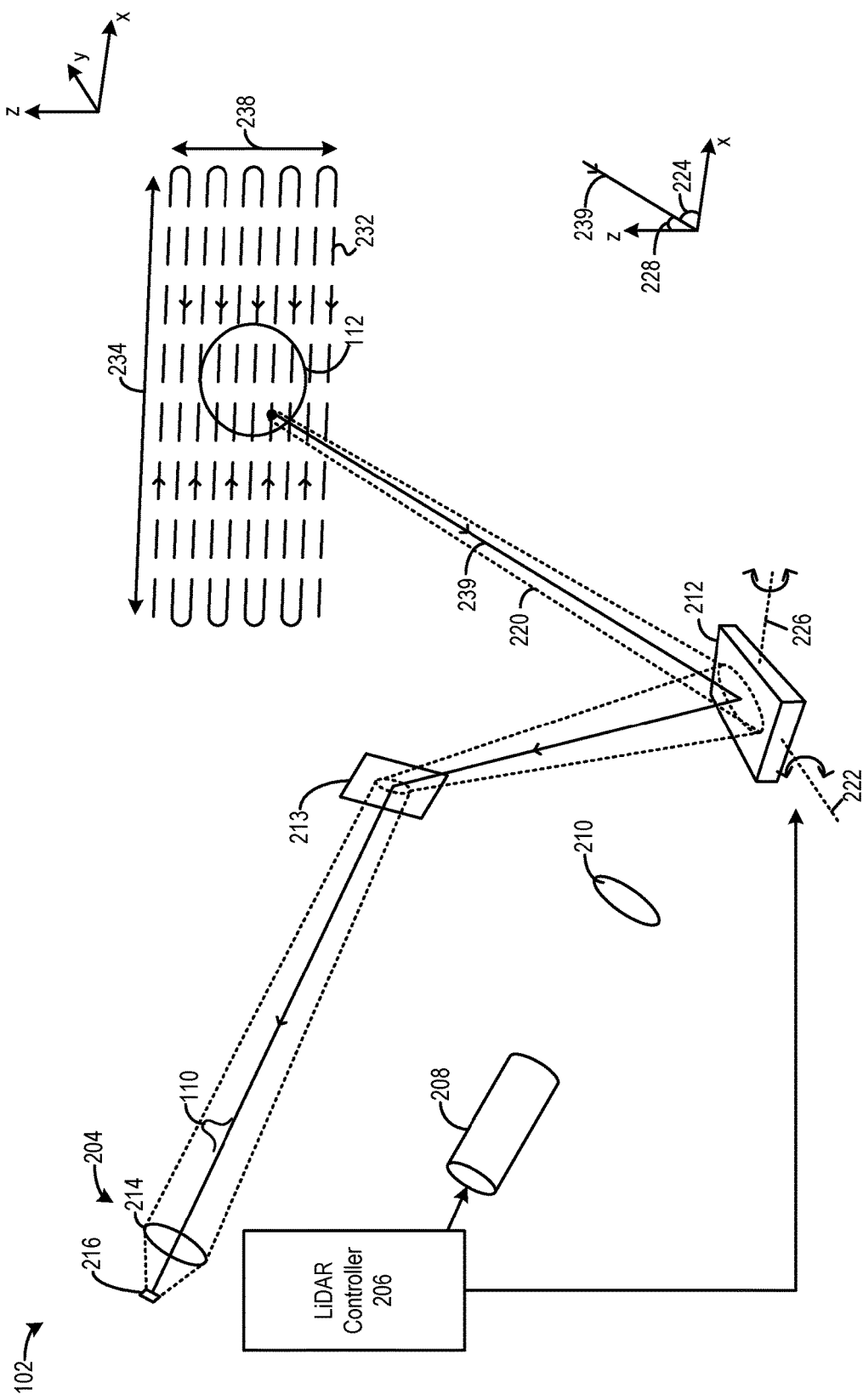

FIG. 2A and FIG. 2B illustrate examples of internal components of a LiDAR module 102. LiDAR module 102 includes a transmitter 202, a receiver 204, a LiDAR controller 206 which controls the operations of transmitter 202 and receiver 204. Transmitter 202 includes a light source 208 and a collimator lens 210, whereas receiver 204 includes a lens 214 and a photodetector 216. LiDAR module 102 further includes a mirror assembly 212 and a beam splitter 213. In LiDAR module 102, transmitter 202 and receiver 204 can be configured as a coaxial system to share mirror assembly 212 to perform light steering operation, with beam splitter 213 configured to reflect incident light reflected by mirror assembly 212 to receiver 204.

FIG. 2A illustrates a light projection operation. To project light, LiDAR controller 206 can control light source 208 (e.g., a pulsed laser diode, a source of FMCW signal, AMCW signal, etc.) to transmit light signal 108 as part of light beam 218. Light beam 218 can disperse upon leaving light source 208 and can be converted into collimated light beam 218 by collimator lens 210.

Collimated light beam 218 can be incident upon mirror assembly 212, which can reflect and steer the light beam along an output projection path 219 towards object 112. Mirror assembly 212 can include one or more rotatable mirrors. FIG. 2A illustrates mirror assembly 212 as having one mirror, but as to be described below, in some embodiments mirror assembly 212 may include a plurality of mirrors.

Light beam 218 may disperse upon leaving the surface of mirror surface of mirror assembly 212. Light beam 218 can form a dispersion angle with respect to projection path 219 over the length and the width of the mirror surface. The dispersion angle of light beam 218 can be given by the following equation:

$$\alpha = \frac{\lambda}{D \times \pi} \quad \text{(Equation 1)}$$

In Equation 1, α is the dispersion angle, λ is the wavelength of light beam 218, whereas D is the length (or width) of the mirror surface. Light beam 218 can disperse at a dispersion angle $\alpha_L$ with respect to projection path 219 over the length (L) of the mirror surface, and at a dispersion angle $\alpha_W$ with respect to projection path 219 over the width (W) of the mirror surface. It is desirable to reduce the dispersion angle to focus the light beam power along projection path 219, to improve the resolution of object detection, ranging, and imaging. To reduce the dispersion angle, the length and width D of the mirror surface can be increased to match with aperture length 220.

Mirror assembly 212 further includes one or more actuators (not shown in FIG. 2A) to rotate the rotatable mirrors. The actuators can rotate the rotatable mirrors around a first axis 222, and can rotate the rotatable mirrors along a second axis 226. As described in more detail below, the rotation around first axis 222 can change a first angle 224 of output projection path 219 with respect to a first dimension (e.g., the x-axis), whereas the rotation around second axis 226 can change a second angle 228 of output projection path 219 with respect to a second dimension (e.g., the z-axis). LiDAR controller 206 can control the actuators to produce different combinations of angles of rotation around first axis 222 and second axis 226 such that the movement of output projection path 219 can follow a scanning pattern 232. A range 234 of movement of output projection path 219 along the x-axis, as well as a range 238 of movement of output projection path 219 along the z-axis, can define a FOV. An object within the FOV, such as object 112, can receive and reflect collimated light beam 218 to form reflected light signal, which can be received by receiver 204.

FIG. 2B illustrates a light detection operation. LiDAR controller 206 can select an incident light direction 239 for detection of incident light by receiver 204. The selection can be based on setting the angles of rotation of the rotatable mirrors of mirror assembly 212, such that only light beam 220 propagating along light direction 239 gets reflected to beam splitter 213, which can then divert light beam 220 to photodetector 216 via collimator lens 214. With such arrangements, receiver 204 can selectively receive signals that are relevant for the ranging/imaging of object 112, such as light signal 110 generated by the reflection of collimated light beam 218 by object 112, and not to receive other signals. As a result, the effect of environment disturbance on the ranging/imaging of the object can be reduced, and the system performance can be improved.

Examples of Mirror Assemblies

Figure 3C:
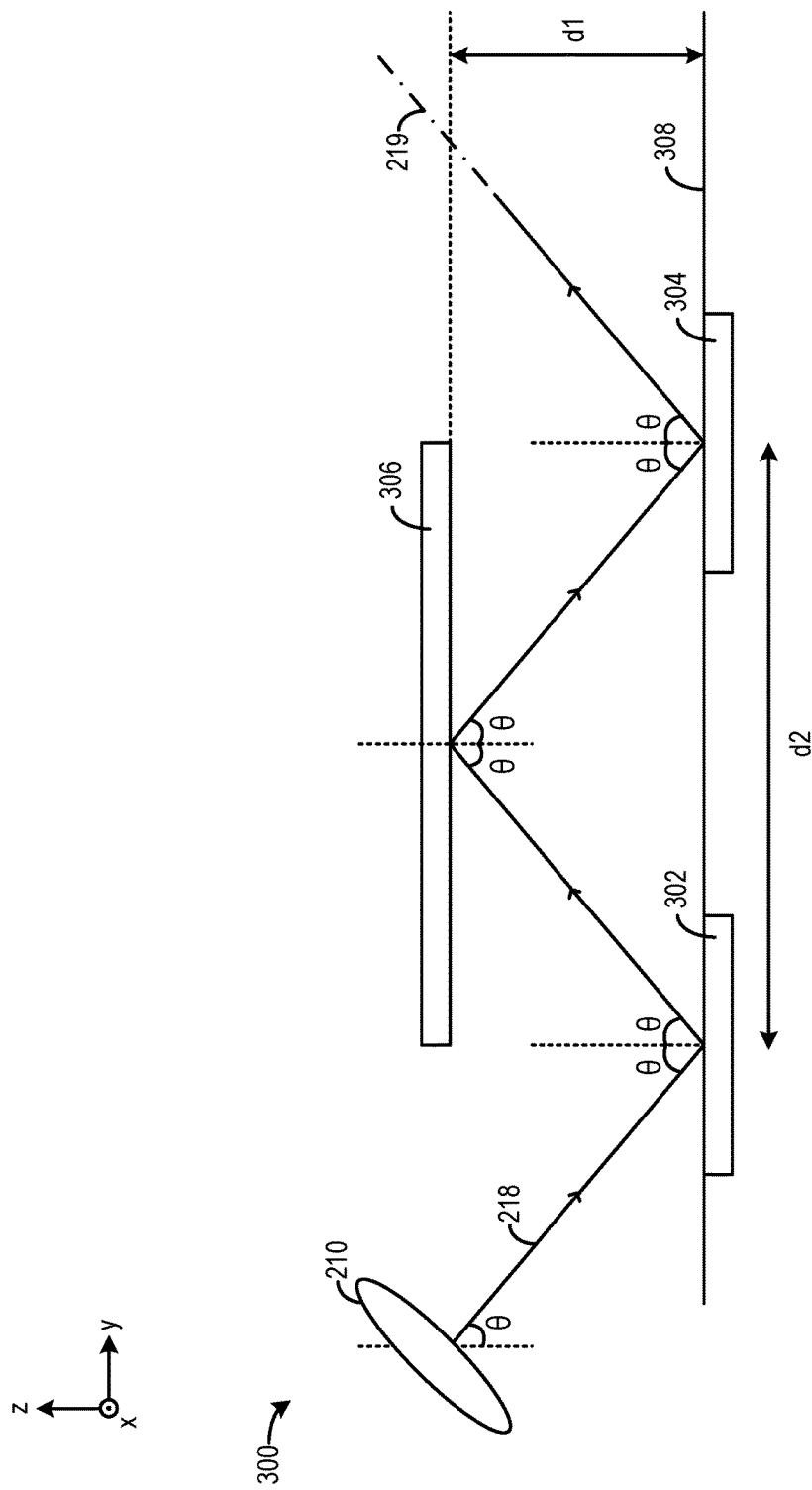

FIG. 3A-FIG. 3E illustrate an example of a mirror assembly 300, according to embodiments of the present disclosure. Mirror assembly 300 can be part of light steering system 202. FIG. 3A illustrates a top view of mirror assembly 300, FIG. 3B illustrates a perspective view of mirror assembly 300, whereas FIG. 3C illustrates a side view of mirror assembly 300. As shown in FIG. 3A, mirror assembly 300 can include an array of first rotatable mirrors 302, a second rotatable mirror 304, and a stationary mirror 306. The total mirror surface area of the array of first rotatable mirrors 302 is identical to the mirror surface area of second rotatable mirror 304 and of stationary mirror 306. The array of first rotatable mirrors 302 and second rotatable mirror 304 can be MEMS devices implemented on a surface 308 of a semiconductor substrate 310. Stationary mirror 306 can be positioned above semiconductor substrate 310. In some embodiments, stationary mirror 306 can be included within the same integrated circuit package as semiconductor substrate 310 to form an integrated circuit. In some embodiments, stationary mirror 306 can also be positioned external to the integrated circuit package that houses semiconductor substrate 310.

Referring to FIG. 3B and FIG. 3C, in one configuration, array of first rotatable mirrors 302 can receive collimated light beam 218 from collimator lens 210, reflect the light beam 218 towards stationary mirror 306, which can reflect the light beam 218 towards second rotatable mirror 304. Second rotatable mirror 304 can reflect light beam 218 received from stationary mirror 306 as an output along output projection path 219. In another configuration (not shown in the figures), second rotatable mirror 304 can receive collimated light beam 218 from collimator lens 210 and reflect the light beam 218 towards stationary mirror 306, which can reflect the light beam 218 towards array of first rotatable mirrors 302. Array of first rotatable mirrors 302 can reflect light beam 218 as an output along output projection path 219. In a case where mirror assembly 300 is part of the receiver, the array of first rotatable mirrors 302 and second rotatable mirror 304 can also select incident light direction 239 for receiver 204 similar to the selection of direction of output projection path 219. As described in further detail below, array of first rotatable mirrors 302 and second rotatable mirror 304 change an angle of output projection path 219 with respect to, respectively, the x-axis and the z-axis, to form a two-dimensional FOV.

As described above, the total mirror surface area of the array of first rotatable mirrors 302 is identical to the mirror surface area of second rotatable mirror 304 and of stationary mirror 306. Moreover, each dimension (e.g., length and width) of the mirror surface area provided by each of the array of first rotatable mirrors 302, second rotatable mirror 304, and stationary mirror 306 can match aperture length 220 of collimator lens 210. With such arrangements, each of the array of first rotatable mirrors 302, second rotatable mirror 304, and stationary mirror 306 can receive and reflect a majority portion of collimated light beam 218.

Moreover, as shown in FIG. 3C, the separation between stationary mirror 306 and surface 308 (which includes an array of first rotatable mirrors 302 and second rotatable mirror 304, denoted as d1, as well as the separation between the center points of an array of first rotatable mirrors 302 and second rotatable mirror 304, denoted as d2, can be related to incident angle θ of collimated light beam 218 with respect to the z-axis, as follows:

$$\frac{\frac{d2}{2}}{d1} = \tan(\theta) \qquad \text{(Equation 2)}$$

In Equation 2, the ratio between half of d2 (the distance between the center points of an array of first rotatable mirrors 302 and second rotatable mirror 304) and d1 (the distance between stationary mirror 306 and surface 308) can be defined by applying tangent function to the incident angle θ of collimated light beam 218.

Referring back to FIG. 3A, each rotatable mirror of the array of first rotatable mirrors 302 (e.g., first rotatable mirror 302a) is rotatable around a first axis 314, whereas second rotatable mirror 304 is rotatable around a second axis 316 which is orthogonal to first axis 314. Each rotatable mirror of the array of first rotatable mirrors 302, as well as second rotatable mirror 304, is coupled with a pair of rotary actuators, such as comb drive, piezoelectric device, electromagnetic device, etc., to rotate the mirror. For example, first rotatable mirror 302a is coupled with and rotary actuators 322a and 322b, whereas second rotatable mirror 304 is coupled with rotary actuators 324a and 324b. Each of first rotatable mirror 302a (and the rest of array of first rotatable mirrors 302) and second rotatable mirror 304 can independently move output projection path 219 along, respectively, the x-axis and the z-axis, to form a FOV.

Figure 3D:
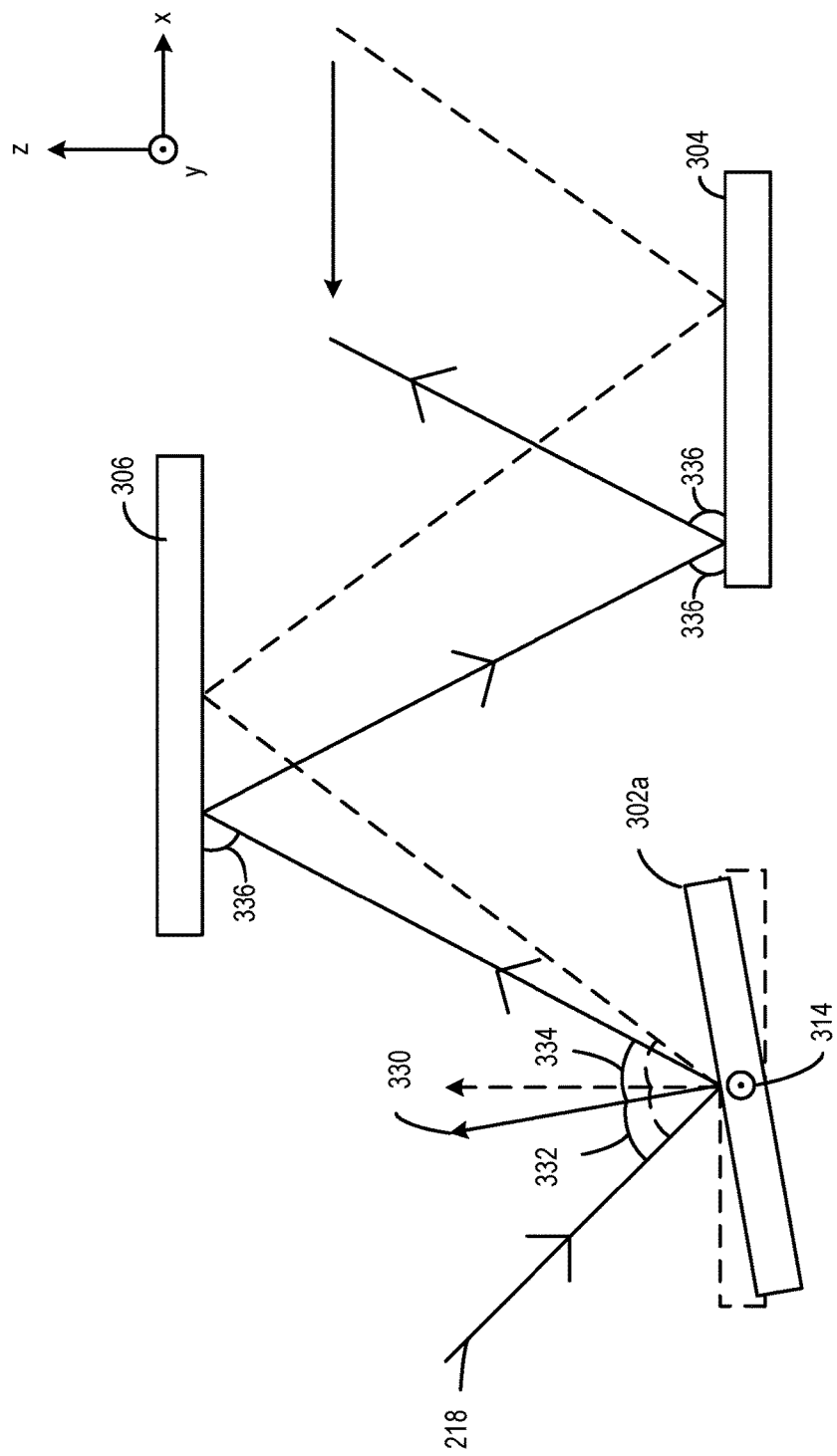

FIG. 3D illustrates an example of setting an angle of output projection path 219 with respect to the x-axis based on the rotation movement of first rotatable mirror 302a. FIG. 3D shows a side view of rotatable mirror 302a with first axis 314, stationary mirror 306, and second rotatable mirror 304. First axis 314 is aligned with the y-axis. The dotted lines show the orientations of first rotatable mirror 302a and normal vector 330 of first rotatable mirror 302a before rotation, while the solid lines show the orientations of first rotatable mirror 302a and normal vector 330 after a counter-clockwise rotation. As first rotatable mirror 302a rotates counter-clockwise, normal vector 330 of first rotatable mirror 302a also rotates counter-clockwise, and the angle of incidence 332 of collimated light beam 218 with respect to the rotated normal vector 330 reduces. As the angle of reflection 334 of collimated light beam 218 is equal to the angle of incidence 332, the reflected light beam 218 also rotates counter-clockwise and hit stationary mirror 306 at an increased angle 336. Light beam 218 is also reflected from stationary mirror 306 at the same angle 336 towards second rotatable mirror 304, which can reflect light beam 218 along output projection path 219 or input path 239 that also forms angle 336 with the x-axis. Each rotatable mirror of the array of first rotatable mirrors 302 can be controlled to rotate by the same angle of rotation and at the same direction (clockwise or counterclockwise) around first axis 314, so that the array can collectively set output projection path 219 of collimated light beam 218, or incident light direction 239, to form angle 336 with respect to the x-axis.

Figure 3E:
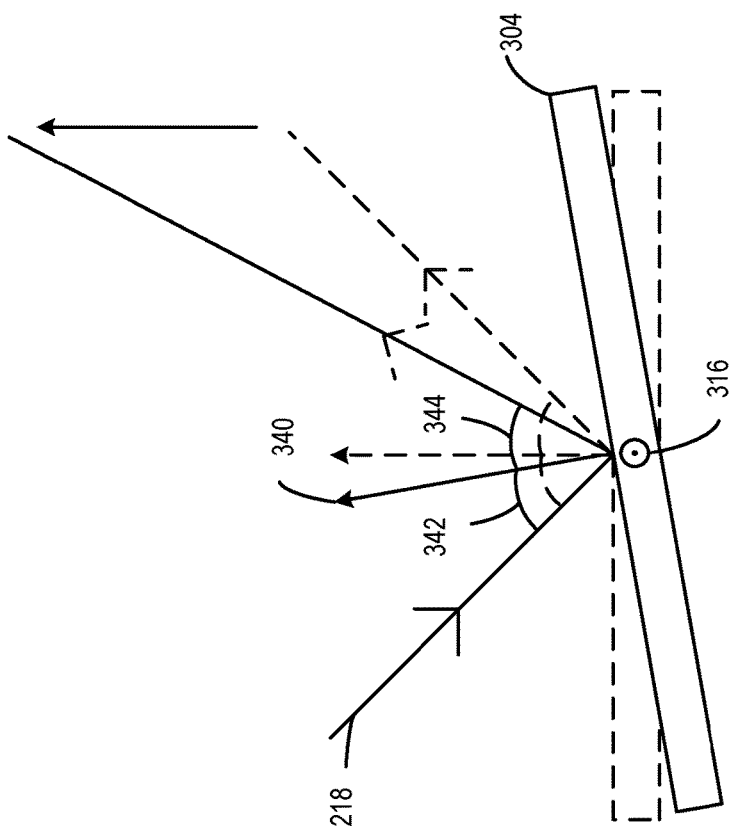

FIG. 3E illustrates an example of movement of output projection path 219 based on the rotation movement of second rotatable mirror 304. FIG. 3E is a side view of second rotatable mirror 304 with second axis 316 pointing out of paper. The dotted lines show the orientations of second rotatable mirror 304 and normal vector 340 of second rotatable mirror 304 before rotation, while the solid lines show the orientations of second rotatable mirror 304 and normal vector 340 after a counter-clockwise rotation. As second rotatable mirror 304 rotates counter-clockwise, normal vector 340 of second rotatable mirror 304 also rotates counter-clockwise, and the angle of incidence 342 of collimated light beam 218 with respect to the rotated normal vector 340 reduces. As the angle of reflection 344 of collimated light beam 218 is equal to the angle of incidence 342, output projection path 219 of reflected light beam 218 moves along the z-axis by a distance d4 as indicated by the arrow. Combined with the rotation of first rotatable mirror 302a, output projection path 219 can move along both the x-axis and the z-axis to form a two-dimensional FOV. It is understood that incident light direction 239 can also be adjusted based on the rotation movement of second rotatable mirror 304 in a similar fashion as output projection path 219.

Figure 4:
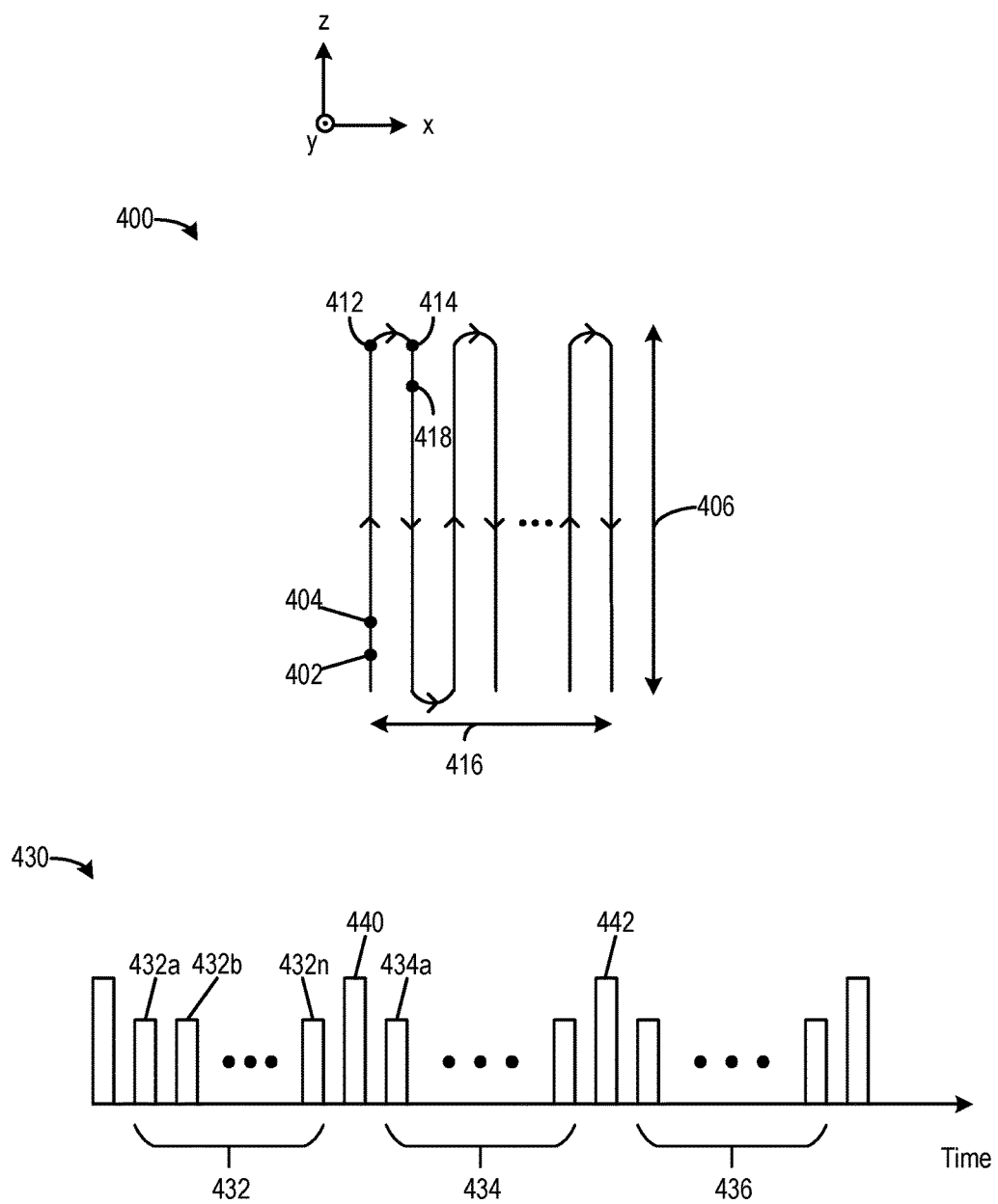
FIG. 4 illustrates an example of operation of the mirror assembly of FIG. 3A-FIG. 3E to provide a two-dimensional field of view (FOV), according to certain embodiments.
Figure 5B:
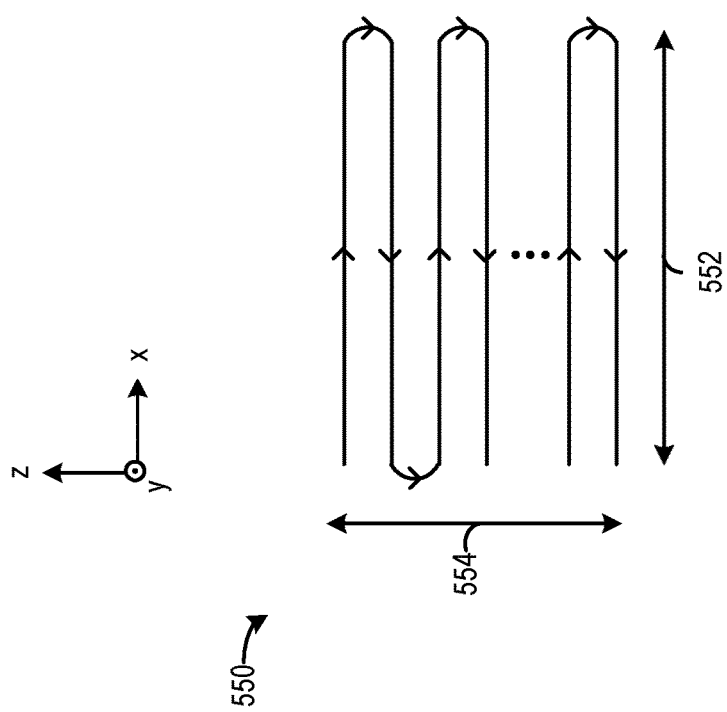

FIG. 4 illustrates an example operation of mirror assembly 300 to provide a two-dimensional FOV. The diagram on the top of FIG. 4 illustrates a movement sequence 400 of an angle of output projection path 219 provided by the rotations of array of first rotatable mirrors 302 and second rotatable mirror 304. As shown in FIG. 4, LiDAR controller 206 can control rotary actuators 324a and 324b to rotate second rotatable mirror 304 to set different angles of output projection path 219 with respect to the z-axis, for example, at angles represented by points 402 and 404, to within a first angle range 406. LiDAR controller 206 can also control the rotary actuators of array of first rotatable mirrors 302 (e.g., rotary actuators 322a and 322b) to set different angles of output projection path 219 with respect to the x-axis, for example, at angles represented by points 412 and 414, to provide a second angle range 416, and the two angle ranges can define a FOV.

The figure on the bottom of FIG. 4 illustrates a control signals sequence 430, with respect to time, to generate movement sequence 400 of output projection path 219. In some embodiments, movement sequence 400 can be provided to LiDAR controller 206, which can generate control signals sequence 430 based on movement sequence 400. Control signals sequence 430 comprises first dimension control signals sequences 432, 434, 436, etc., of control signals for the rotary actuators of second rotatable mirrors 304 to change the angle of output projection path 219 (or incident light direction 239) with respect to a first dimension (e.g., z-axis). Control signals sequence 430 further include a second dimension control signal between two first dimension control signals sequences. For example, there is a second dimension control signal 440 between first dimension control signals sequences 432 and 434. Further, there is a second dimension control signal 442 between first dimension control signals sequences 434 and 436. The second dimension control signals are for the rotary actuators of array of first rotatable mirrors 302 to change the angle of output projection path 219 (or incident light direction 239) with respect to a second dimension (e.g., x-axis).

Each control signal in control signals sequences 432, 434, 436, etc., can cause the rotary actuators of second rotatable mirror 304 to generate a torque force to increment the angle of rotation of the second rotatable mirror 304 around second axis 316. For example, first dimension control signal 432a can correspond to point 402, whereas first dimension control signal 432b can correspond to point 404. Each of first dimension control signals sequences 432, 434, and 436 can cause a sweep of angles of output projection path 219 (or incident light direction 239) across first angle range 406 with respect to the z-axis by controlling the angle of rotation of the second rotatable mirror. At the end of first angle range 406, a second dimension control signal can be provided to change the angle of projection path 219 (or incident light direction 239) with respect to the x-axis before the next first dimension control signals sequence starts. For example, first dimension control signal 432n corresponds to point 412 which is at the end of first angle range 406. Following first dimension control signal 432b is second dimension control signal 440, which can rotate array of first rotatable mirrors 302 to move output projection path 219 (or incident light direction 239) from points 412 to 414 along the x-axis. Following second dimensional control signal 440, first dimension control signals sequence 434 starts, and first dimension control signal 434a can rotate second rotatable mirror 304 to move the angle of output projection path 219 (or incident light direction 239) with respect to the z-axis from an angle represented by point 414 to an angle represented by 418, while keeping the angle with respect to the x-axis constant.

In some embodiments, first dimension control signals and second dimension control signals can be independently optimized to reduce total actuation forces and power. For example, first dimension control signals can be provided to the rotary actuators at a relatively high frequency close to the natural frequency of second rotatable mirror 304 to induce harmonic resonance of the mirror. Such arrangements allow use of smaller torques to rotate second rotatable mirror 304, which is advantageous given that second rotatable mirror 304 can be the largest mirror within mirror assembly 300 and has considerable mass and inertia. On the other hand, second dimension control signals can be provided to the rotary actuators at a relatively low frequency to operate each rotatable mirror of array of first rotatable mirrors 302 as quasi-static loads. The torques required to rotate the mirrors of array of first rotatable mirrors 302 may be relatively low, given that the mirrors are small and have small mass and inertia. In some embodiments, first dimension control signals can be in the form of high frequency sinusoidal signals, pulse width modulation (PWM) signals, etc., whereas second dimension control signals can be in the form of low frequency saw-tooth signals.

In some embodiments, in addition to movement sequence 400, a feedback mechanism can also be provided to LiDAR controller 206 to generate control signals sequence 430. The feedback mechanism includes a set of sensors (e.g., capacitive sensors) to measure actual angles of rotation at the rotary actuators. The feedback mechanism enables LiDAR controller 206 to adjust the first dimension and second dimension control signals provided to the rotary actuators based on monitoring the actual angle of rotations at the rotary actuators, to improve the precision of the light steering operation. The adjustment can be performed to compensate for, for example, uncertainties and mismatches in the masses of the mirrors, driving strength of the rotary actuators, etc.

As an example, LiDAR controller 206 can perform adjustment of the first dimension and second dimension control signals in a calibration sequence. LiDAR controller 206 may store a set of initial settings (e.g., voltage, current, etc.) for the first dimension and second dimension control signals based on a set of expected masses of the mirrors and driving strength of the rotary actuators. During the calibration process, LiDAR controller 206 can provide different first dimension and second dimension control signals to create different angles of rotations at the rotary actuators. LiDAR controller 206 can monitor the actual angles of rotations at the rotary actuators when the first dimension and second dimension control signals are provided, compare the actual angles of rotations against the target angles of rotations to determine differences, and adjust the first dimension and second dimension control signals to account for the differences. For example, each rotatable mirror of array of first rotatable mirrors 302 is supposed to rotate at the same angle of rotation. LiDAR controller 206 can measure the actual angles of rotation of each rotatable mirror of array of first rotatable mirrors 302 using the capacitive sensors and determine a deviation of each actual angle from the target angle of rotation for each rotatable mirror. LiDAR controller 206 can adjust the second dimension control signals for the rotary actuators of each rotatable mirror (e.g., rotary actuators 322a and 322b) based on the deviations to ensure that each rotatable mirror rotates by the same target angle of rotation.

Compared with a single mirror assembly, mirror assembly 300 can provide same or superior FOV and dispersion performance while reducing the actuation force and power and improving reliability. First, each rotatable mirror of the array of first rotatable mirrors 302 is substantially smaller than a single mirror having a comparable length and width and dispersion performance, even if the mirrors are driven as quasi-static loads. As a result, each rotatable mirror of the array of first rotatable mirrors 302 requires substantially smaller torque to provide the same FOV as the single mirror assembly. Moreover, although the mirror surface area of the second rotatable mirror 304 is similar to the area of the single mirror arrangement, the torque needed to rotate second rotatable mirror 304 can be substantially reduced by driving second rotatable mirror 304 at close to a natural frequency to induce harmonic resonance. Such arrangements allows substantial reduction in the required torque to achieve a target FOV. The reduction of torque also reduces the burden on the rotary actuators and increases their lifespan. In addition, as a plurality of mirrors are involved in the steering of light, the likelihood of any of the mirror becoming a single source of failure can be mitigated, which can further improve reliability.

FIG. 5A illustrates another example of a mirror assembly 500, according to embodiments of the present disclosure. Mirror assembly 500 can be part of light steering system 202. As shown in FIG. 5A, mirror assembly 500 can include a first rotatable mirror 502, an array of second rotatable mirrors 504, and stationary mirror 306. Each of first rotatable mirror 502, array of second rotatable mirror 504, and stationary mirror 306 can have substantially same mirror surface area and can have dimensions matching aperture length 220 of lens 210, as in other examples described above. First rotatable mirror 502, an array of second rotatable mirrors 504 can be MEMS devices implemented on a surface 508 of a semiconductor substrate 510. Stationary mirror 306 can be positioned above semiconductor substrate 510. First rotatable mirror 502 may receive collimated light beam 218 from lens 210, reflect the collimated light beam 218 towards stationary mirror 306, which can in turn reflect collimated light beam 218 towards array of second rotatable mirrors 504. Array of second rotatable mirrors 504 can reflect the collimated light beam 218 received from stationary mirror 306 as output along output projection path 219. First rotatable mirror 502 is rotatable around a first axis 514, whereas each rotatable mirror of the array of second rotatable mirrors 504 is rotatable around a second axis 516 which is orthogonal to first axis 514. Just as array of first rotatable mirrors 302 of FIG. 3A, the rotation of first rotatable mirror 502 can set an angle of output projection path 219 (or incident light direction 239) with respect to the x-axis, whereas the rotation of array of second rotatable mirrors 504 can set an angle of output projection path 219 (or incident light direction 239) with respect to the z-axis.

First rotatable mirror 502 and array of second rotatable mirror 504 can independently change the angle of output projection path 219 (or incident light direction 239) with respect to, respectively, the x-axis and the z-axis, to form a two-dimensional FOV. The rotation of first rotatable mirror 502 and array of second rotatable mirrors 504 can be controlled based on a movement sequence 550 of FIG. 5B. First rotatable mirror 502 can be controlled by first dimension control signals to move output projection path 219 (or incident light direction 239) along the x-axis within a movement range 552, whereas array of second rotatable mirrors 504 can be controlled by second dimension control signals to move projection path along the z-axis within a movement range 554. Similar to the arrangements described in FIG. 4, first dimension control signals can be provided at a relatively high frequency close to the natural frequency of first rotatable mirror 502 to induce harmonic resonance, whereas second dimension control signals can be provided at a relatively low frequency to drive each of the array of second rotatable mirrors 504 as quasi-static loads.

In some examples, a mirror assembly can include two arrays of rotatable mirrors to perform light steering along a first dimension (e.g., the x-axis) and a second dimension (e.g., the z-axis). FIG. 6 illustrates an example of a mirror assembly 600 that includes array of first rotatable mirrors 302 of FIG. 3A and array of second rotatable mirrors 504 of FIG. 5A on a surface 608 of a semiconductor substrate 610. Mirror assembly 600 further includes stationary mirror 306 positioned above semiconductor substrate 610. Array of first rotatable mirrors 302 is rotatable around first axis 314, whereas array of second rotatable mirrors 504 is rotatable around second axis 516 which is orthogonal to first axis 314. Array of first rotatable mirrors 302 and array of second rotatable mirror 504 can independently change the angle of output projection path 219 with respect to, respectively, the x-axis and the z-axis, to form a two-dimensional FOV as described above.

Figure 7:
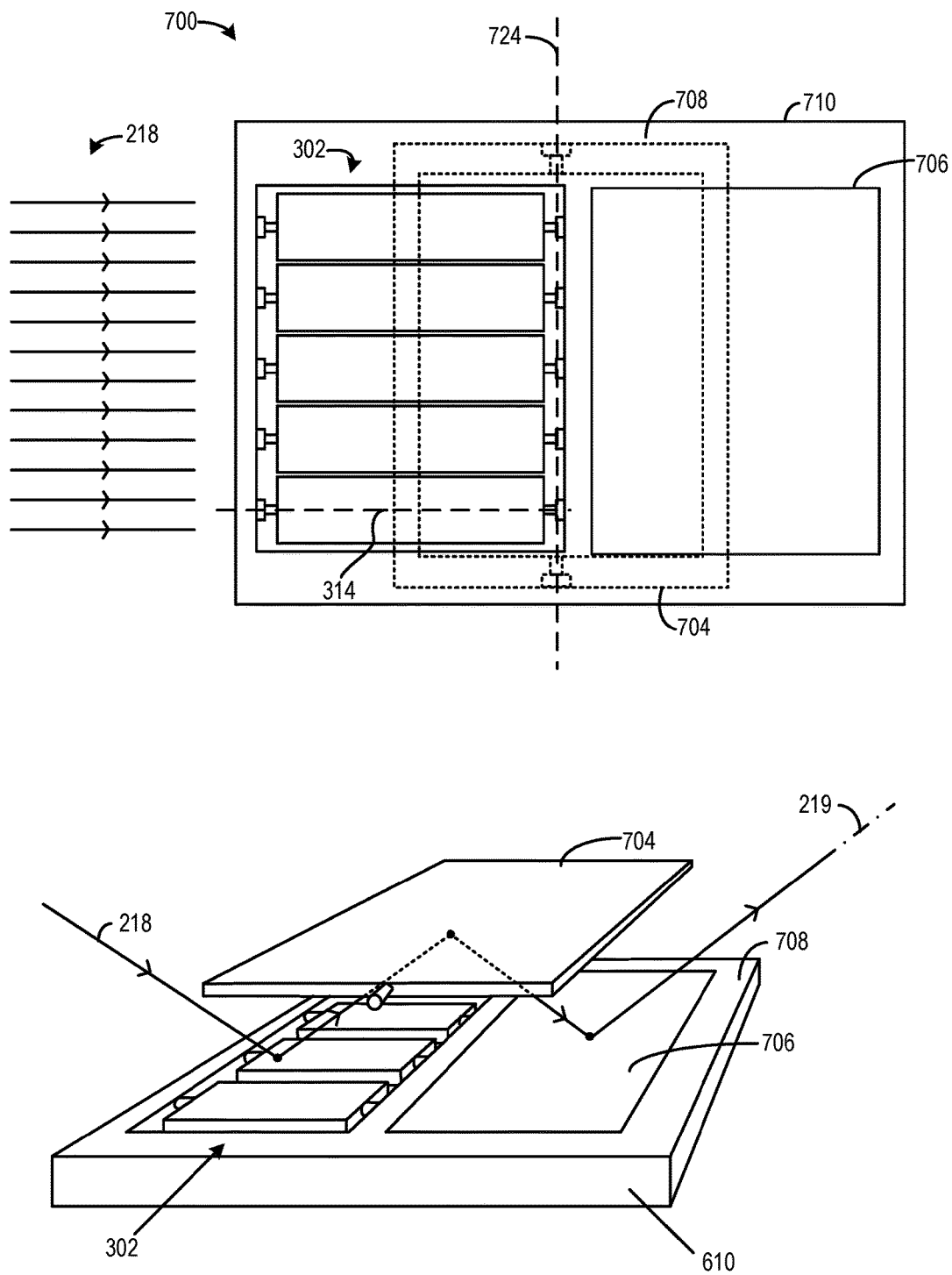
FIG. 7 illustrates another example of a mirror assembly, according to certain embodiments.

FIG. 7 illustrates another example of a mirror assembly 700, according to embodiments of the present disclosure. Mirror assembly 700 can be part of light steering system 202. The top figure of FIG. 7 shows a top view of mirror assembly 700, whereas the bottom figure of FIG. 7 shows a perspective view of mirror assembly 700. As shown in FIG. 7, mirror assembly 700 can include array of first rotatable mirrors 302, a second rotatable mirror 704, and an optional mirror 706 which can be stationary or rotatable. Array of first rotatable mirrors 302 and mirror 706 can be implemented as a surface 708 of a first semiconductor substrate 710, whereas second rotatable mirror 704 can be implemented on a second semiconductor substrate (not shown in FIG. 7) and facing array of first rotatable mirrors 302 and mirror 706. Each of array of first rotatable mirrors 302, second rotatable mirror 704, and mirror 706 may have substantially identical mirror surface area having each dimension matching aperture length 210 of lens 210, as in other examples described above. Array of first rotatable mirrors 302 can receive collimated light beam 218 (or reflected light beam 220) and reflect the light towards second rotatable mirror 704, which can reflect the light from array of first rotatable mirrors 302 towards mirror 706. Mirror 706 can reflect the light received from second rotatable mirror 704 as output along output projection path 219. Mirror 706 can also reflect input light towards second rotatable mirror 704, and only light that propagates along incident light direction 239 will be reflected to array of first rotatable mirrors 302. Array of first rotatable mirrors 302 is rotatable around first axis 314, whereas second rotatable mirror 704 is rotatable around second axis 724 which is orthogonal to first axis 314. The rotation of each rotatable mirror of array of first rotatable mirrors 302 can set an angle of output projection path 219 (or incident light direction 239) with respect to the x-axis, whereas the rotation of second rotatable mirror 704 can set an angle of output projection path 219 (or incident light direction 239) with respect to the z-axis. Mirror 706 can be stationary or can be rotatable to allow further adjustment of the direction of output projection path 219 (or incident light direction 239).

Figure 8:
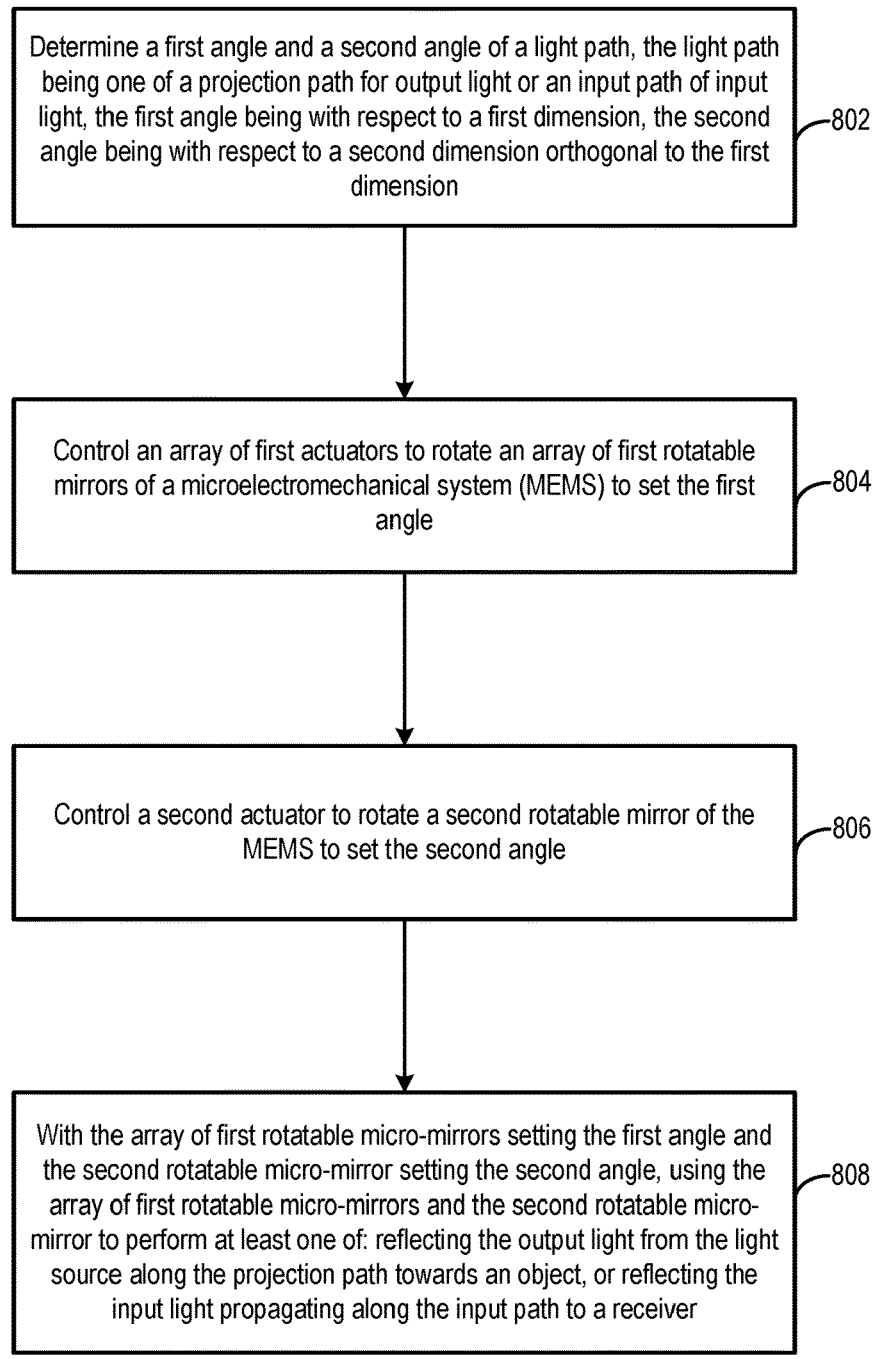
FIG. 8 illustrates a flowchart of a method of operating a mirror assembly, according to certain embodiments.

FIG. 8 shows a simplified flow diagram of method 800 for performing light steering operation using a mirror assembly, such as mirror assemblies 300, 500, 600 and 700 of FIGS. 3A-FIG. 7 The mirror assembly comprises an array of first rotatable mirrors (e.g., array of first rotatable mirrors 302, array of second rotatable mirrors 504, etc.) and a second rotatable mirror (e.g., second rotatable mirror 304, first rotatable mirror 502, second rotatable mirror 704, etc.). The array of first rotatable mirrors and the second rotatable mirror can be part of a microelectromechanical system (MEMS). Method 800 can be performed by a controller, such as LiDAR controller 206.

At operation 802, the controller determines a first angle and a second angle of a light path, the light path being one of a projection path for output light or an input path of input light, the first angle being with respect to a first dimension, the second angle being with respect to a second dimension orthogonal to the first dimension. The first angle may be set according to a scanning pattern (e.g., movement sequence 400) within range of angle 416 of FIG. 4. The second angle may be set according to the scanning pattern (e.g., movement sequence 400) within range of angle 406 of FIG. 4.

At operation 804, the controller controls an array of first actuators to rotate an array of first rotatable mirrors of the MEMS to set the first angle. The controller can control the array of first actuators to exert a torque to each rotatable mirror of the array of first rotatable mirrors as a quasi-static load.

At operation 806, the controller controls a second actuator of the MEMS to rotate a second rotatable mirror to set the second angle. The controller can control the second actuator to exert a torque to the second rotatable mirror to induce harmonic resonance of the mirror, to reduce the required torque.

At operation 808, with the array of first rotatable mirrors setting the first angle and the second rotatable mirror setting at the second angle, the controller uses the array of first rotatable mirrors and the second rotatable mirror to perform at least one of: reflecting the output light from the light source along the projection path towards an object, or reflecting the input light propagating along the input path to a receiver. For example, the controller can control a light source to project a light beam including a light signal towards the mirror assembly. The light source may include a pulsed laser diode, a source of FMCW signal, a source of AMCW signal, etc. The controller can also use the array of first rotatable mirrors and the second rotatable mirror to direct input light signal reflected by the distant object to a receiver and not to direct light signals received at other directions to the receiver.

Computer System

Figure 9:
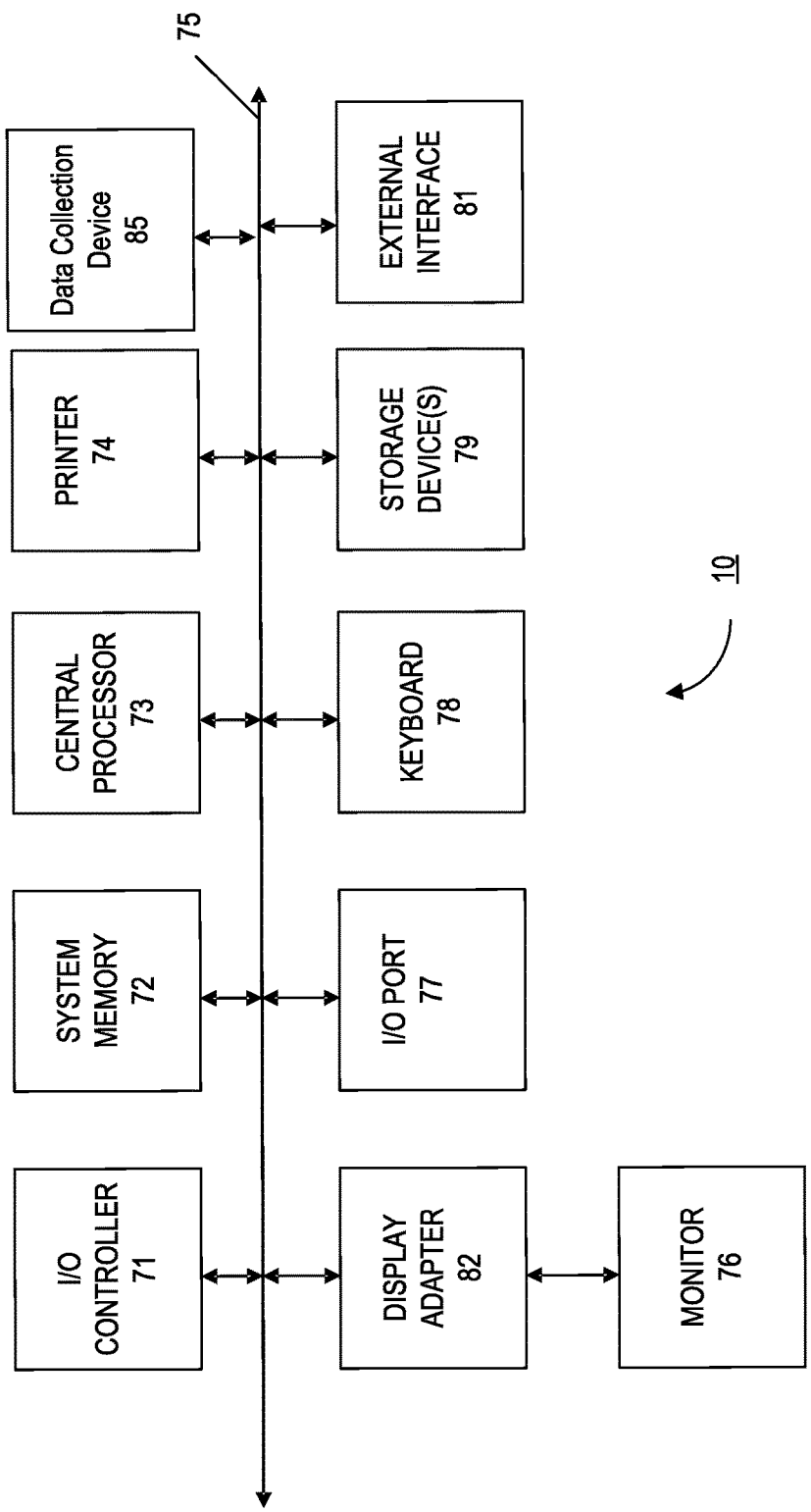
FIG. 9 illustrates an example computer system that may be utilized to implement techniques disclosed herein.

Any of the computer systems mentioned herein may utilize any suitable number of subsystems. Examples of such subsystems are shown in FIG. 9 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices. In some embodiments, a cloud infrastructure (e.g., Amazon Web Services), a graphical processing unit (GPU), etc., can be used to implement the disclosed techniques, including the techniques described from FIG. 1-FIG. 8. For example, computer system 10 can be used to implement the functionality of LiDAR controller 206 and to perform the operations of method 800.

The subsystems shown in FIG. 9 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the embodiments, alternative embodiments, etc., and the concepts thereof may be applied to any other embodiments described and/or within the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. An apparatus comprising a Light Detection and Ranging (LiDAR) module, the LiDAR module comprising:
    a light source;
    a receiver; and
    a semiconductor integrated circuit comprising a microelectromechanical system (MEMS) and a controller,
    wherein the MEMS comprises:
      an array of first rotatable mirrors;
      a second rotatable mirror;
      an array of first actuators configured to rotate each rotatable mirror of the array of first rotatable mirrors; and
      a second actuator configured to rotate the second rotatable mirror;
    wherein a mass of each rotatable mirror of the array of first rotatable mirrors is smaller than a mass of the second rotatable mirror,
    wherein a surface area of the entire array of first rotatable mirrors is substantially the same as a surface area of the second rotatable mirror;
    wherein the controller is configured to:
      control the array of first actuators using a first control scheme to rotate the array of first rotatable mirrors to set a first angle of a light path with respect to a first dimension, the rotating of the array of first rotatable mirrors comprises adjusting a first rotation angle of each rotatable mirror of the array of first rotatable mirrors at a first frequency; and
      control the second actuator using a second control scheme to rotate the second rotatable mirror to set a second angle of the light path with respect to a second dimension orthogonal to the first dimension, the rotating of the second rotatable mirror comprises adjusting a second rotation angle of the second rotatable mirror at a second frequency higher than the first frequency, the second control scheme using a natural frequency of the second rotatable mirror to rotate the second rotatable mirror, and the first control scheme using a frequency different than a natural frequency of each of the first rotatable mirrors to rotate each of the first rotatable mirrors; and
    wherein the array of first rotatable mirrors and the second rotatable mirror are configured to, with the array of first rotatable mirrors setting the first angle and the second rotatable mirror setting the second angle, perform at least one of: reflecting light from the light source along the light path, or reflecting input light propagating along the light path to the receiver.

2. The apparatus of claim 1, wherein the light source is a laser diode.

3. The apparatus of claim 1, wherein the light comprises a first light signal; and
    wherein the controller is configured to:
    control the light source to transmit the light including the first light signal at a first time;
    control the array of first actuators and the second actuator to output the light including the first light signal along the light path towards an object;
    control the array of first the array of first actuators and the second actuator to select the input light including a second light signal propagating along the light path from the object;
    receive, via the receiver, the second light signal at a second time; and
    determine a location of the object with respect to the apparatus based on a difference between the first time and the second time, the first angle, and the second angle.

4. The apparatus of claim 1, wherein the array of first rotatable mirrors and the second rotatable mirror are formed on a surface of a semiconductor substrate of the semiconductor integrated circuit.

5. The apparatus of claim 4, further comprising a third mirror facing the array of first rotatable mirrors and the second rotatable mirror and configured to reflect the light reflected from the array of first rotatable mirrors towards the second rotatable mirror.

6. The apparatus of claim 5, wherein the third mirror is separated from the surface of the semiconductor substrate by a first distance;
    wherein the array of first rotatable mirrors and the second rotatable mirror are separated by a second distance; and
    wherein the first distance and the second distance are set based on an angle of incidence of the light from the light source with respect to a rotatable mirror of the array of first rotatable mirrors.

7. The apparatus of claim 1, further comprising a collimator lens positioned between the light source and the array of first rotatable mirrors,
    wherein the collimator lens has a pre-determined aperture length.

8. The apparatus of claim 7, wherein each dimension of the array of first rotatable mirrors and of the second rotatable mirror is equal to the aperture length.

9. The apparatus of claim 1, wherein the array of first rotatable mirrors are formed on a first surface of a first semiconductor substrate of the semiconductor integrated circuit;
wherein the second rotatable mirror is formed on a second surface of a second semiconductor substrate of the semiconductor integrated circuit; and
wherein the first surface faces the second surface.

10. The apparatus of claim 1, wherein each actuator of the array of first actuators and the second actuator comprises a rotary drive; and
wherein the controller is configured to adjust the first rotation angle and the second rotation angle based on adjusting, respectively, a first torque provided by each actuator of the array of first actuators and a second torque provided by the second actuator.

11. The apparatus of claim 10, wherein each actuator of the array of first actuators and second actuator comprises at least one of: a comb drive, a piezoelectric device, or an electromagnetic device.

12. The apparatus of claim 1, further comprising motion sensors, each motion sensor being coupled with each rotatable mirror of the array of first rotatable mirrors and the second rotatable mirror and configured to measure a rotation angle of each of the array of first rotatable mirrors and the second rotatable mirror;
wherein the controller is configured to:
receive data from the motion sensors; and
determine a signal for each actuator of the array of first actuators and the second actuator based on the data such that each rotatable mirror of the array of first rotatable mirrors and the second rotatable mirror rotate at, respectively, a first target angle and a second target angle.

13. A method, comprising:
determining a first angle and a second angle of a light path, the light path being one of a projection path for output light from a light source or an input path of input light, the first angle being with respect to a first dimension, the second angle being with respect to a second dimension orthogonal to the first dimension;
controlling an array of first actuators using a first control scheme to rotate an array of first rotatable micromirrors of a microelectromechanical system (MEMS) to set the first angle, the rotating of the array of first rotatable micro-mirrors comprises adjusting a first rotation angle of each rotatable mirror of the array of first rotatable mirrors at a first frequency;
controlling a second actuator using a second control scheme to rotate a second rotatable mirror of the MEMS to set the second angle, the rotating of the second rotatable mirror comprises adjusting a second rotation angle of the second rotatable mirror at a second frequency higher than the first frequency, the second control scheme using a natural frequency of the second rotatable mirror to rotate the second rotatable mirror, and the first control scheme using a frequency different than a natural frequency of each of the first rotatable mirrors to rotate each of the first rotatable mirrors, wherein a surface area of the entire array of first rotatable mirrors is substantially the same as a surface of the second rotatable mirror; and
with the array of first rotatable mirrors setting the first angle and the second rotatable mirror setting the second angle, using the array of first rotatable mirrors and the second rotatable mirror to perform at least one of: reflecting the output light from the light source along the projection path, or reflecting the input light propagating along the input path to a receiver.

14. The method of claim 13, further comprising:
controlling the light source to transmit the output light including a first light signal at a first time;
controlling the array of first actuators and the second actuator to output the output light including the first light signal along the light path towards an object;
controlling the array of first the array of first actuators and the second actuator to select the input light including a second light signal propagating along the light path from the object;
receiving, via the receiver, the second light signal at a second time; and
determining a location of the object based on a difference between the first time and the second time, the first angle, and the second angle.

15. The method of claim 13, further comprising:
receiving, from motion sensors, information indicating the first rotation angle of each rotatable mirror of the array of first rotatable mirrors and the second rotation angle of the second rotatable mirror;
adjusting first control signals to the array of first actuators based on a difference between the first rotation angle and a first target rotation angle; and
adjusting a second control signal to the second actuator based on a difference between the second rotation angle and a second target rotation angle.

16. A non-transitory computer readable medium storing instructions that, when executed by a hardware processor, causes the hardware processor to:
determine a first angle and a second angle of a light path, the light path being one of a projection path for output light from a light source or an input path of input light, the first angle being with respect to a first dimension, the second angle being with respect to a second dimension orthogonal to the first dimension;
control an array of first actuators using a first control scheme to rotate an array of first rotatable mirrors of a microelectromechanical system (MEMS) to set the first angle, the rotation of the array of first rotatable mirrors comprises adjusting a first rotation angle of each rotatable mirror of the array of first rotatable mirrors at a first frequency;
control a second actuator using a second control scheme to rotate a second rotatable mirror of the MEMS to set the second angle, the rotation of the second rotatable mirror comprises adjusting a second rotation angle of the second rotatable mirror at a second frequency higher than the first frequency, the second control scheme using a natural frequency of the second rotatable mirror to rotate the second rotatable mirror, and the first control scheme using a frequency different than a natural frequency of each of the first rotatable mirrors to rotate each of the first rotatable mirrors, wherein a surface area of the entire array of first rotatable mirrors is substantially the same as a surface of the second rotatable mirror; and
with the array of first rotatable mirrors setting the first angle and the second rotatable mirror setting the second angle, use the array of first rotatable mirrors and the second rotatable mirror to perform at least one of: reflecting the output light from the light source along the projection path or reflecting the input light propagating along the input path to a receiver.

17. The non-transitory computer readable medium of claim 16, further comprising instructions that, when executed by the hardware processor, cause the hardware processor to:
 control the light source to transmit the output light including a first light signal at a first time;
 control the array of first actuators and the second actuator to output the output light including the first light signal along the light path towards an object;
 control the array of first the array of first actuators and the second actuator to select the input light including a second light signal propagating along the light path from the object;
 receive, via the receiver, the second light signal at a second time; and
 determine a location of the object based on a difference between the first time and the second time, the first angle, and the second angle.

\* \* \* \* \*